United States Patent [19]

Bouchard et al.

[11] Patent Number: 5,465,079
[45] Date of Patent: Nov. 7, 1995

[54] METHOD AND APPARATUS FOR DETERMINING DRIVER FITNESS IN REAL TIME

[75] Inventors: Paul J. Bouchard, San Diego; Jerry D. Woll, Poway; Bryan D. Woll, Laguna Niguel; Jimmie R. Asbury, San Diego, all of Calif.

[73] Assignee: Vorad Safety Systems, Inc., San Diego, Calif.

[21] Appl. No.: 106,407

[22] Filed: Aug. 13, 1993

Related U.S. Application Data

[63] Continuation-in-part of Ser. No. 930,066, Aug. 14, 1992, Pat. No. 5,302,956, and a continuation-in-part of Ser. No. 930,158, Aug. 14, 1992, abandoned.

[51] Int. Cl.[6] ............................................. G08B 21/00
[52] U.S. Cl. ...................... 340/576; 180/272; 340/425.5; 340/439
[58] Field of Search ............................... 340/576, 439, 340/425.5; 180/272

[56] References Cited

U.S. PATENT DOCUMENTS

| | | | |
|---|---|---|---|
| 4,005,398 | 1/1977 | Inoue et al. | 340/576 |
| 4,101,870 | 7/1978 | Ekman | 180/272 |
| 4,168,499 | 9/1979 | Matsumura et al. | 180/272 |
| 4,500,868 | 2/1985 | Tokitsu et al. | 340/439 |
| 4,804,937 | 2/1989 | Barbiaux et al. | 340/425.5 |
| 5,325,082 | 6/1994 | Rodridquez | 340/439 |

*Primary Examiner*—Glen Swann
*Attorney, Agent, or Firm*—Baker, Maxham, Jester & Meador

[57] ABSTRACT

A method and apparatus for evaluating a driver's performance under actual real-time conditions and for using such evaluations to determine the driver's ability to safely operate a vehicle compares the information gathered by a radar system and other sensors with information previously stored in an event recording device. Conditions monitored are used to make a determination as to whether the driver is performing in conformity with normal driving standards and the driver's own past performance. The driver's performance is constantly monitored and compared to that driver's past performance to determine whether the driver's present performance is impaired, and if so, whether the impairment is detrimental to the driver's ability to safely operate the vehicle.

7 Claims, 18 Drawing Sheets

THE USE OF ASSESSMENT IN VARIOUS DRIVING ENVIROMENTS

| PROFILES: | STOPPED | URBAN | SUBURBAN | HIGHWAY |
|---|---|---|---|---|
| THROTTLE | YES | YES | YES | YES |
| SPEED | NA | NO | ? | YES |
| CLOSURE | NA | YES | YES | YES |
| DISTANCE | NA | YES | YES | YES |
| MARGIN | NA | NO | NO | YES |
| STEERING | NA | NO | ? | YES |
| TURN SIGNAL | NO | YES | YES | YES |
| SEC. TASK | NO | NO | NO | YES |
| BLINKS | YES | YES | YES | YES |

FIG. 19

METHOD AND APPARATUS FOR DETERMINING DRIVER FITNESS IN REAL TIME

RELATED APPLICATION

This application is a continuation-in-part of (1) application Ser. No. 07/930,066 of Jimmie R. Asbury, Bryan D. Woll, and Van R. Malan, which application was filed Aug. 14, 1992 and is entitled MULTI-FREQUENCY, MULTI-TARGET VEHICULAR RADAR SYSTEM USING DIGITAL SIGNAL PROCESSING, now U.S. Pat. No. 5,302,956 and (2) application Ser. No. 07/930,158 of Jerry D. Woll, Bryan D. Woll and Van R. Malan, which was filed on Aug. 14, 1992 and is entitled RECORDING OF OPERATIONAL EVENTS IN AN AUTOMOTIVE VEHICLE, now abandoned.

BACKGROUND OF THE INVENTION

1. Field of the Invention

This invention relates to a method and apparatus for determining whether a person is capable of performing specific tasks, and more particularly, whether a person is fit to operate a motor vehicle.

2. Description of Related Art

There is a continuing need to increase the density of vehicles traveling the world's roadways, and simultaneously to improve the safety of highway vehicle operations by preventing highway vehicles from colliding with stationary and moving objects (such as roadside obstacles and other vehicles). One means for accomplishing these seemingly contradictory goals is to monitor the relative speed, direction of travel, and distance between vehicles sharing the roadway, and to use such information to provide direct indications to the vehicle's operator of potential danger. It is becoming increasingly more common for automotive engineers to consider the use of microwave radar systems as a means to monitor and warn drivers of such environmental conditions. Another means for accomplishing these diverse goals is to ensure that the driver of each vehicle is fit to operate the vehicle for which the driver is responsible.

Whenever a person is responsible for operating a motor vehicle, it is critical that the person be capable of demonstrating basic cognitive and motor skills at a level that will assure the safe operation of the vehicle. A number of conditions can impair a person's ability to perform the basic cognitive and motor skills that are necessary for the safe operation of a motor vehicle. For example, consumption of alcohol or narcotic drugs, or lack of sleep can make it impossible for a person to react appropriately to a potentially hazardous situation with sufficient speed to avoid danger to the operator, the vehicle, and other people and property which might be in the potential zone of danger. Therefore, it is very important to continuously evaluate a driver's ability to identify an appropriate action and react under the conditions encountered while operating a motor vehicle. Such conditions can cause a driver to experience extreme boredom and fatigue. For example, a truck driver carrying a load of merchandise cross-country is likely to experience boredom and fatigue under the conditions of such a long and monotonous interstate highway trip.

A number of pre-trip tests have been developed which allow a driver's fitness to operate a motor vehicle to be evaluated before the driver enters the vehicle. In one such test, a potential driver is requested to stand or sit before a panel that simulates the dashboard of a vehicle which the potential driver is to operate. A screen, such as a cathode ray tube (CRT) screen, simulates the view the driver would have when looking out the windshield of the vehicle. A mock steering wheel, brake pedal, and accelerator pedal are monitored to detect the reactions of the potential driver to events displayed on the screen. The potential driver's reactions are evaluated to determine whether the potential driver is performing adequately to safely operate a vehicle. The problem with such a pre-trip test is that the driver is only tested at the outset of his shift and it is quite possible for his fitness to deteriorate dramatically in the hours following his pre-trip test.

In a variation of the pre-trip test described above, a potential driver enters a specially-equipped vehicle and pulls down a screen located in the sun visor. Images are displayed on the screen and the driver must react to the images using the actual vehicle controls, such as the brake pedal, the accelerator pedal, and the steering wheel. As is the case in the previously described test, the driver's performance is evaluated by comparing the drivers remeasured reactions to a predetermined standard to determine whether the driver is fit to safely operate the vehicle. Only if the potential driver performs adequately will the engine of the vehicle operate. While this test more closely approximates the conditions encountered by the driver on the road, it nonetheless is not performed under actual conditions or in real-time. Furthermore, the condition of the driver may change during the course of the trip. For example, the driver may consume alcohol or a narcotic drug, or may become sleepy after operating the vehicle for a period of time. Thus, a need exists for dynamic, continuous, real-time testing of a driver's ability to safely operate a vehicle.

Turning the reader's attention now to vehicle borne radar systems as another means for enhancing the safe operation of vehicles, a number of vehicle borne radar systems which monitor the relationship of the vehicle to other vehicles and to obstacles are known. For example, systems are known that transmit and receive at three different frequencies on a time division basis, with two of the frequencies being used to determine range, and the third being combined with one of the first two to determine closing speed and likelihood of collision, are presently known. One such system is disclosed in U.S. Pat. No. 3,952,303 to Watanabe et al., which teaches an analog radar signal processing front end.

However, analog systems such as the one disclosed in Watanabe are sensitive to temperature changes, difficult to calibrate, limited in resolution and reliability, and are require complex processing. Furthermore, such systems are dedicated to particular tasks, such as determining the range and relative rate of motion of other objects, and therefore are difficult to upgrade and customize to meet varying requirements. Still further, the transmit and receive frames in such three frequency systems can be wasteful, in that only small portions thereof are needed to determine the range and relative rate of motion of a target, with the remaining portions of the frame being unused.

Another recent example of an automotive radar system that uses analog signal processing techniques to analyze reflected radar signals is described in U.S. patent application Ser. No. 08/020,600, entitled "Multi-Frequency Automotive Radar System", and assigned to the assignee of the present invention. In that system, a transmit signal and the reflected received signal are coupled to an RF mixer. The relevant output from the RF mixer is a signal that has a frequency equal to the difference between the transmit and receive frequencies. The frequency of the reflected received signal may be shifted from the frequency of the transmit signal upon its return due to the "Doppler" effect. The Doppler effect occurs whenever a transmitted signal reflects off a target that has a motion relative to a transceiver. The resulting frequency shift is referred to as a "Doppler shift".

The transmit signal changes at regular intervals between three frequencies spaced 250 kHz apart. Two of the frequencies are used to generate range information as described therein, while a third frequency is used to determine Doppler closing rate and target selection. After substantial analog waveform detection, amplification, shaping, and gating, the information regarding range, closing rate, and target selection of a single target can be input to a microcontroller for digital processing.

The use of analog processing techniques is fast and allows real time processing. However, the cost of analog circuitry is typically much greater than the cost of digital circuitry. In addition, digital circuitry is more reliable and capable of higher precision and more complex processing than analog circuitry. Thus, the sooner the analog signal can be converted to a digital signal and handled by digital circuitry, the lower the cost, the greater the performance, and the higher the reliability of the system. Additionally, digital signal processing circuits are much less sensitive to temperature and manufacturing variations and interference from noise than are analog signal processing circuits. Furthermore, the use of analog signal processing techniques limits the number of features that can be added to a system since each new feature typically requires all new processing hardware. In contrast, many additional features can be added to a system in which digital signal processing is used to determine range and relative motion simply by adding or modifying software. Still further, in analog systems the level of sophistication that can be achieved is limited by the available hardware and the cost of such hardware.

Furthermore, in vehicular radar systems, only a small part of the reflected signal is returned to the antenna. Thus, target detection runs from very good to non-existent, even when a strongly reflecting target is present. Improving the ability to detect targets requires sophisticated signal processing and tracking algorithms. Under many circumstances, such sophisticated signal processing is the only means by which meaningful information can be attained. Without sophisticated information processing, it may be difficult to identify and interpret the reflected signal. This requirement for sophisticated processing makes digital signal manipulation especially advantageous.

Another means by which roadways are being made more safe is by recording operational information regarding drivers and vehicles during vehicle operation. A number of electronic devices exist that record data on various aspects of vehicle performance and/or environment information. Such devices have used magnetic tape and paper strips to record such information. These devices primarily function as trip recorders, storing information such as trip distance, trip time, miles per gallon consumed, and average speed.

A drawback of such devices is that magnetic tapes and paper strips are susceptible to the detrimental effects of heat and vibration commonly found in a vehicular environment. A further drawback is that prior art vehicular recording devices have not been used in conjunction with an automotive radar system to record such information as the closing rate (CR) between the recording vehicle and other vehicles located by the vehicle's radar system, the distance (D) between the recording vehicle and other vehicles, vehicle speed (VS), and such vehicle performance and environment information as braking pressure, vehicle acceleration or deceleration in one or more dimensions, rate of turning of the vehicle, steering angle, hazard levels determined from a radar system processor, detected vehicle direction, and cruise control status, to name a few.

Further, it is believed that such automotive recording devices have not been used to record information to be used for accident reconstruction. Most commercial aircraft and some private aircraft are equipped with an event recording device commonly called a "black box". This device records pertinent data from the aircraft's major subsystems as the aircraft is operating. If an accident occurs, the "black box" generally can be retrieved from the aircraft and the recorded information extracted to determine the status of subsystems of the aircraft just before the accident. Such information is then used to reconstruct the events leading up to the accident, and can help determine the cause of the accident. Black box recording devices have proven invaluable in aircraft accident reconstruction. However, this type of technology is quite expensive, and its use has been limited to more expensive vehicles such as aircraft. In addition, it is believed that all such devices operate using a cumbersome magnetic tape to record data. These devices also tend to be larger, heavier, consume more power, and cost more than would be acceptable for automotive use.

In the area of automobile accident reconstruction, an accident analyst determines how an accident most probably occurred by measuring, among other things, the length of skid marks, the extent of vehicle and nearby property damage, and the condition of the road at the time of the accident. This method of reconstructing accidents has been shown to be expensive and inaccurate at times. Accordingly, it would be desirable for automotive vehicles to have a system that would function as an event recording "black box". Such a system should record information relating to the vehicle and the environment around the vehicle prior to an accident. Such data should be readable after an accident for use in reconstructing the events leading up to the accident. An accident could then be reconstructed using real historical data, as opposed to post-accident estimated data.

In addition to recording data useful for accident reconstruction, it would also be desirable for such a device to record more standard vehicle performance, operational status, and/or environment data. In addition, it would be desirable that such a device be configurable for a driver's particular preferences, or to provide an authorization function that prohibits unauthorized personnel from driving the vehicle, and/or to provide a convenient means for upgrading system-wide software for an automotive electronic control system or an automotive radar system.

Accordingly, there is a need for an automotive event recording system. In addition, there is a need for an automotive radar system that converts signals received into digital form before processing of those signals. Furthermore, there is a need for a simplified system in which only two frequencies are broadcast and in which a larger portion of the transmit signal is useful. The present invention provides a system which accomplishes these desired objectives.

Still further, it would be desirable to have a method and apparatus which utilizes the information that is gathered by a radar system and other sensors, and the information that has been recorded during past trips and a present trip, to evaluate a driver's performance in real-time and under actual conditions. It would also be desirable for such a system to predict when a driver is near the point of being unfit to safely operate a vehicle and determine when the driver is actually unfit to safely operate a vehicle.

The present invention meets these needs.

SUMMARY OF THE INVENTION

The present invention provides a method and apparatus which functions as an event recording device that can personalize a vehicle to the driver associated with that event recording device. Further, the present invention provides a method and apparatus that converts automotive radar signals into digital signals before processing those signals, and both displays the results and stores the results of the digital processor in the event recording device. Still further, the present invention provides a method and apparatus for evaluating a driver's performance under actual real-time conditions to determine the driver's ability to safely operate a vehicle, utilizing the information that is gathered by the radar system and other sensors, together with information that was previously stored in the event recording device.

The present invention operates by monitoring conditions external to a driver of a motor vehicle. Each of the conditions monitored are used to make a determination as to whether the driver is performing in conformity with normal driving standards and the driver's past performance. The driver's performance is constantly monitored and compared to that driver's past performance to determine whether the driver's present performance is impaired, and if so, whether the impairment is detrimental to the driver's ability to safely operate the vehicle. Some of the conditions are monitored by sensors which provide independent outputs. Additionally, some of the conditions are determined by a vehicular radar system.

In the preferred embodiment of the present invention, the radar system operates as a part of three distinct systems: (1) a collision warning system, (2) an operational event recording system, and (3) a driver fitness evaluation system. The three functions are distinct, but share a single radar system that provides information to all three systems, and thereby allows a substantial cost benefit to be realized when the three systems are used together. In an alternative embodiment, each system may operate completely independent of each other system.

The radar system of the preferred embodiment of the present invention includes an antenna/microwave transceiver section, a front-end electronics section, a digital electronics section, and a display and sensor section. In the preferred embodiment of the present invention, information regarding each target is output by a microcontroller that includes an audio warning unit, a control display unit, a plurality of sensors, and a digital interface to allow communications with outside devices.

The preferred embodiment of the present invention also provides a removable, externally readable, non-volatile solid-state memory event recording apparatus (ERA) that records selectable vehicle performance, operational status, and/or environment information. The ERA preferably records information useful for accident analysis and driver fitness evaluation. In the preferred embodiment of the present invention, the information that is recorded is also used to determine a baseline performance standard based on the driver's past performance against which a driver's present performance can be measured. In addition, the ERA of the preferred embodiment of the present invention can be used to store updated software for use by a system processor capable of reading data from the ERA. The ERA system is configured to store a wide variety of vehicle information gathered by sensors dispersed throughout a vehicle. The ERA can also be configured to function as a common trip recorder.

In the preferred embodiment of the present invention, each driver maintains a removable ERA that is personalized to that particular driver. Each ERA has information that identifies the driver, and a record of that driver's driving history and performance. The driver must insert the ERA before the driver may start the engine of a vehicle equipped with a system in accordance with the preferred embodiment of the present invention. A system processing unit, which in the preferred embodiment of the present invention is shared by the radar system, the ERA, and the driver fitness evaluating system, generates a profile of the driver based upon the information that is stored in the ERA.

The system processor monitors each of the external conditions and activities that are relevant to determining the fitness of the driver to operate the vehicle. In the preferred embodiment of the present invention, if driving performance is found to be below the individual standard calculated for that particular driver at any time during a trip, the driver is alerted to the fact that driving performance is not up to the calculated individual minimum standard. If the driver's performance continues to degrade (or, in an alternative embodiment, does not improve), an indication of the driver's performance is communicated to a remote site to alert a dispatcher or controller. If the driver's performance degrades still further, the vehicle ceases operating after a sufficient warning is provided to the driver that such action is imminent. Each step of the process, along with the data that is collected at each step of the process, is recorded in the ERA.

The details of the preferred embodiment of the present invention are set forth in the accompanying drawings and the description below. Once the details of the invention are known, numerous additional enhancements and changes will become obvious to one skilled in the art.

BRIEF DESCRIPTION OF THE DRAWINGS

FIG. 19 is a table illustrating the use of assessments in the various driving environments.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Overview

The present invention is a system for determining whether a driver is fit to operate a motor vehicle. The preferred embodiment of the invention operates in cooperation with an obstacle detection and collision avoidance system, and an operational event recording system. However, the inventive system may operate as a stand alone system in which information is dynamically gathered by sensors which are dedicated to the purpose of determining a driver's fitness to operate a vehicle.

Figure 1:
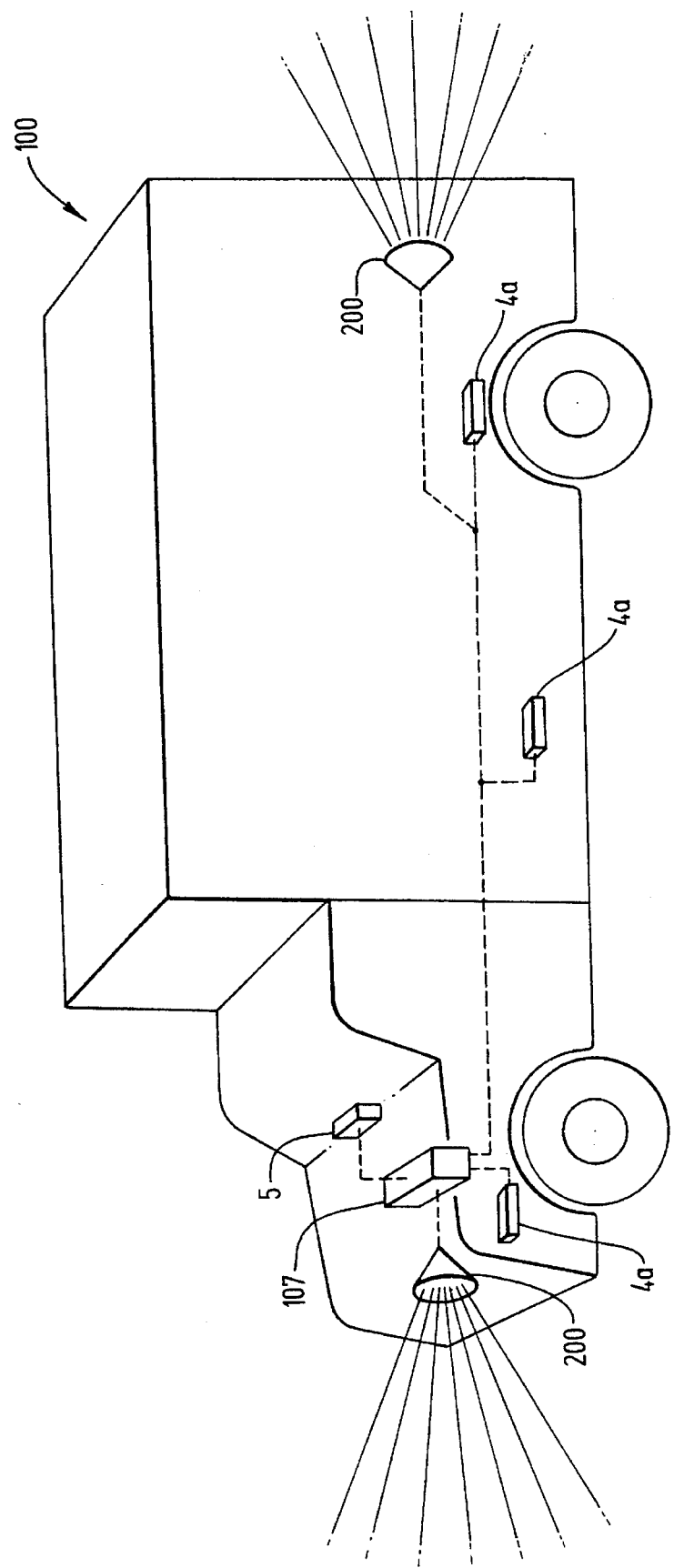
FIG. 1 is an perspective view of a vehicle in which the inventive system is installed.

FIG. 1 is a perspective view of a vehicle 100 in which the preferred embodiment of the present invention is installed. A plurality of sensors 4a and receiver/transmitter modules (such as the antenna/microwave transceiver 200 illustrated in FIG. 2) are strategically located within the vehicle 100. As depicted in FIG. 1, one antenna/microwave transceiver 200 is located in the front of the vehicle 100 and one antenna/microwave transceiver 200 is located in the rear of the vehicle 100. Each of the sensors 4a and antenna/microwave transceivers 200 are electrically coupled to a system processor 107, as represented by connecting broken lines. In the preferred embodiment of the present invention, the system processor 107 includes a front end electronics section 300 and a digital electronics section 500 (refer to FIG. 2). In an alternative embodiment of the present invention, each antenna/microwave transceiver 200 is associated with a front end electronics section 300 which is placed in close proximity to the associated antenna/microwave transceiver 200.

In another alternative embodiment, transceivers 200 may also be installed on the sides of the vehicle to detect obstacles in the vehicle's "blind spot". Such a system is disclosed in U.S. patent application Ser. No. 07/930,079 assigned to the assignee of the present invention.

In the preferred embodiment of the present invention, each of the sensors 4a independently collect information about the environment in which the vehicle is operating, or the condition or operation of the vehicle.

Figure 2:
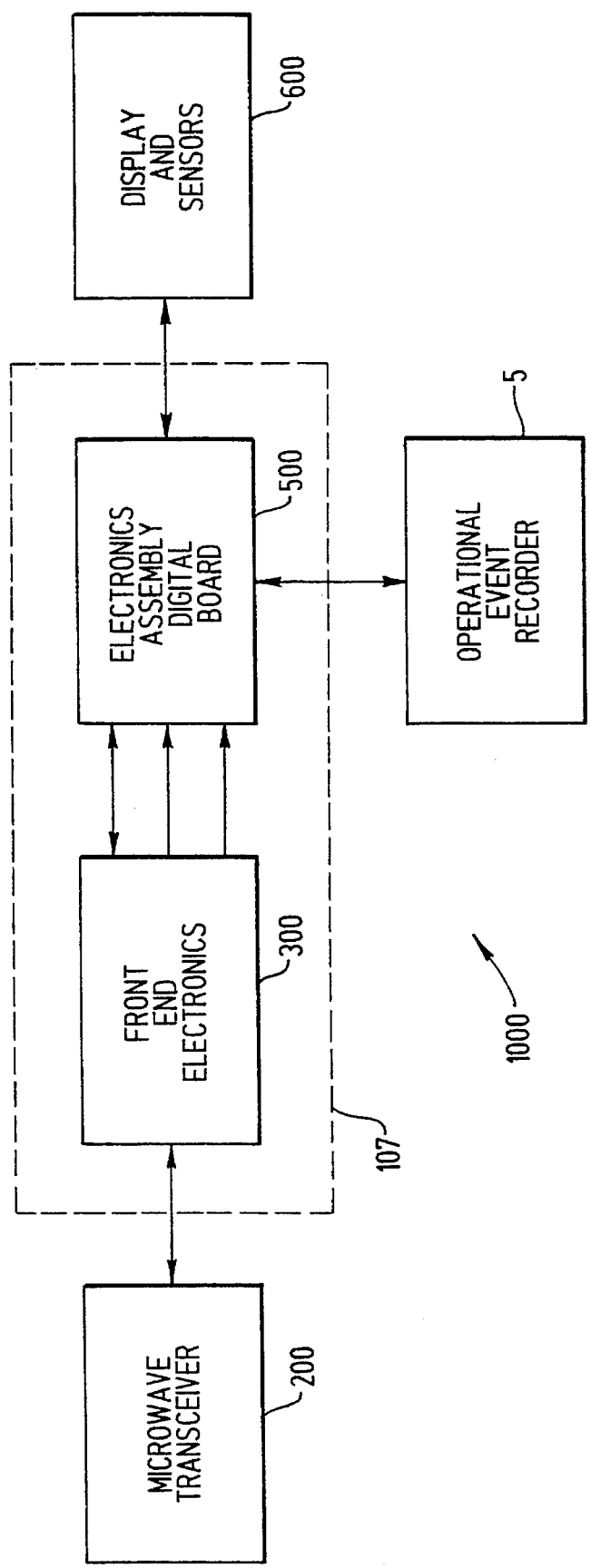
FIG. 2 is a simplified block diagram of the vehicular radar system of the present invention.

FIG. 2 is a high level block diagram of the radar system of the preferred embodiment of the invention. The system 1000 detects objects (targets) in the environment surrounding the system 1000, determines the range and relative motion of each target with respect to the system 1000, and alerts the automotive operator of potential hazards that could result from the presence or motion of such targets.

The antenna/microwave transceiver section 200 of the system 1000 transmits and receives Radio Frequency (RF) signals. The received signals are compared to the transmitted signals. A difference signal is generated having a frequency equal to the difference between the frequency of the transmit and the receive signal. The difference signal is coupled to the front end electronics section 300. The front end electronics section 300 digitizes the difference signal. The digitized difference signal is coupled to the digital electronics section 500 which determines the range and relative motion of each target. The digital electronics section 500 is coupled to an input/output module, such as a display and sensor section 600. The display and sensor section 600 has a plurality of sensors that indicate to the system the status of various vehicle controls. The display and sensor section 600 also produces audio and visual indications for presentation to the automotive operator. In the present invention the radar system is capable of determining the rate at which a target is approaching or retreating, and distance to a plurality of different targets. In an alternative embodiment of the present invention, the radar system may be capable of determining the spacial relationship of the vehicle to the roadway (i.e., whether the vehicle is centered within an appropriate travel lane and whether the roadway is straight or curved and the radius of curvature).

A removable, externally readable, non-volatile solid-state memory event recording apparatus (ERA) 5 is coupled to the system processor 107. The ERA records the output of each of the sensors and information about targets detected by the radar system.

Figure 3:
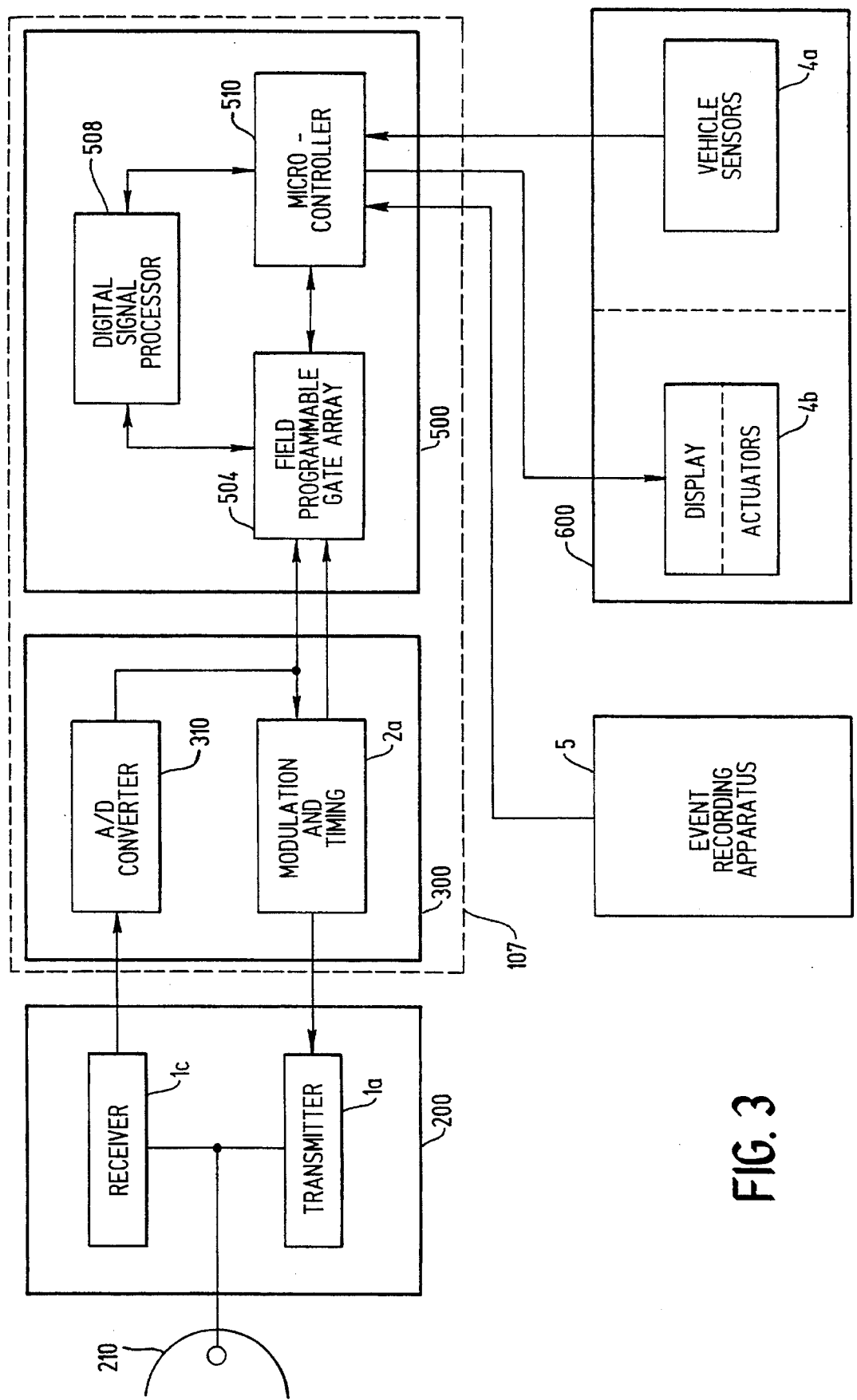
FIG. 3 is an overall block diagram showing the inventive event recording apparatus being used in conjunction with an automotive radar system using digital signal processing.

FIG. 3 is an overall block diagram showing the inventive ERA 5 being used in conjunction with an automotive radar system using digital signal processing. Such a system is described in greater detail in co-pending U.S. patent application Ser. No. 07/930,066, entitled MULTI-FREQUENCY, MULTI-TARGET AUTOMOTIVE RADAR SYSTEM USING DIGITAL SIGNAL PROCESSING, of which this application is a continuation-in-part, and which is assigned to the assignee of the present invention. This radar system is referenced by way of example. However, the invention could be readily adapted to be used in conjunction with other automotive radar systems known in the art, such as the systems described in U.S. Pat. No. 4,673,937, entitled AUTOMOTIVE COLLISION AVOIDANCE AND/OR AIR BAG DEPLOYMENT RADAR, and U.S. Pat. No. 4,916,450, entitled RADAR SYSTEM FOR HEADWAY CONTROL OF A VEHICLE, both of which are assigned to the assignee of the present invention.

Using the present ERA invention in conjunction with such a radar system allows recording of important data relating to obstacles in the path of the vehicle that were detected by the radar system. This type of information is particularly useful in accident reconstruction and in determining a driver's ability to safely operate a vehicle.

Referring to FIG. 3, a antenna/microwave transceiver 200 transmits a radar signal from a radar transmitter 1a via a radar antenna 210, and receives reflected Doppler shifted radar echoes in a receiver 1c through the antenna 210. A control module (such as the front end electronics section 300 of FIG. 2) coupled to the antenna/microwave transceiver 200 contains a modulation and timing circuit 2a that controls the transmission of the radar signal, and an A/D converter 310 for converting the received echo signal into a digital data stream. A signal processing module (such as the digital electronics section 500 of FIG. 2) includes a digital signal processor (DSP) 508, a microcontroller 510, and a field programmable gate array 504, configured to control the flow of digital radar data to the DSP 508 under the control of the microcontroller 510. The digital electronics section 500 is also coupled to the display and sensor section 600.

The display and sensor section 600 which provides information from a variety of vehicle sensors 4a to the microcontroller 510 for use in calculating the hazard level presented by targets indicated from the received radar signal and/or to indicate the operational status and environment of the vehicle. Commonly known sensors may be used, for example, to measure distance travelled, vehicle speed (momentary and average), fuel consumption, fuel remaining, direction of travel, engine temperature, oil pressure, engine RPM, oil temperature, transmission fluid temperature, coolant temperature, engine timing and other values relating to the environment or performance of the vehicle. The digital electronics section 500 itself generates information from the transmitted and received radar signal, such as the closing rate (CR) of a target with respect to the vehicle, the distance (D) of various targets, and the direction of movement (towards or away from) of the targets with respect to the vehicle. Additional information can be obtained by providing other sensors, such as a brake pedal pressure sensor, brake hydraulic line pressure sensor, tire pressure, accelerometer sensors (for example, fore and aft acceleration/deceleration, and/or left and right (yaw) acceleration of the vehicle), turning rate, turn angle, and/or impact sensors (such as the type used to trigger vehicle air bags), windshield wiper status (to determine if it is raining), fog light status, outside temperature, defroster status, and geographic positioning information. Recording some or all of this data or similar relevant data would make accident reconstruction more reliable and less expensive.

The display and sensor section 600 also has a display and/or actuators 4b, for displaying indications to a user and/or controlling various aspects of vehicle operation (for example, flashing a dashboard warning light to a user if a vehicle is approaching too rapidly, and/or, in extreme conditions, automatically activating the vehicle brakes and/or air bag or disabling a vehicle from unauthorized or unfit drivers).

By selecting appropriate outputs from the sensors and radar system which have been recorded in the ERA, (which may include the outputs recorded during past and present trips) a profile of the driver is formed. The driver's performance over a recent period of time is compared to a standard derived from the personal profile calculated using the driver's past performance. The results of the comparison are used to determine the driver's current fitness to operate a vehicle. In the preferred embodiment of the present invention, if the driver's performance at any time during a trip is found to be below the personal standard calculated for that driver, the driver is alerted that driving performance is not up to the driver's personal standard. In the preferred embodiment of the invention, if the driver's performance continues to degrade (or, in an alternative embodiment, does not improve), an indication of the driver's performance is communicated to a remote site to alert a dispatcher or controller. In the preferred embodiment of the invention, if the driver's performance degrades still further, the vehicle ceases operating after a sufficient warning is provided to the driver that such action is imminent. Each step of the process, along with the data that is collected at each step of the process, is recorded in the ERA.

Sensors

The present invention includes a plurality of sensors for sensing a wide range of operational conditions and environmental conditions. Commonly known sensors may be used, for example, the preferred embodiment of the present invention has a mechanical speedometer coupled to the drive train of the vehicle in known fashion. A steering wheel position sensor using a dual Hall-effect device senses the location of a magnetic located on the steering wheel shaft. (Further details regarding the means for determining the position and motion of the steering wheel are disclosed below). A tachometer coupled to the engine in known fashion senses the number of revolutions per minute of the engine. A pressure gauge senses the engine oil pressure. A thermometer senses the temperature of the engine oil and/or engine block. A thermometer senses the temperature of the transmission fluid (if the vehicle uses any such fluid). A thermometer senses the temperature of the engine coolant. Accelerometers sense the rate of lateral acceleration in the direction of forward motion and at right angles to the direction of forward motion. Inclinometers sense the attitude of the vehicle with respect to the gravitational field of the earth. An anti-lock braking system, as is known, is provided and a sensor detects activation of this system. Pressure sensors are placed on the accelerator and brake pedals to sense the amount of pressure being applied to each pedal. A vehicle turn signal sensor senses which, of either of the right or left vehicle turn signals, is active. An external thermometer senses the temperature outside the vehicle. A sensor is also provided which senses when the windshield wipers are active. This list of sensors is not intended to be exhaustive, nor are these particular sensors important in every instance. It should therefore be understood that the number and type of sensors provided in the present invention is not of particular importance. The important aspect of the present invention is the ability to determine the operational conditions under which the driver and vehicle are operating.

The digital electronics section 500 generates information from the transmitted and received radar signal, such as the closing rate (CR) of a target with respect to the vehicle, the distance (D) of various targets, and the direction of movement (towards or away from) of the targets with respect to the vehicle. Additional information can be obtained by providing other sensors, such as a brake pedal pressure sensor, brake hydraulic line pressure sensor, tire pressure, accelerometer sensors (for example, fore and aft acceleration/deceleration, and/or left and right (yaw) acceleration of the vehicle), turning rate, turn angle, and/or impact sensors (such as the type used to trigger vehicle air bags), windshield wiper status (to determine if it is raining), fog light status, defroster status, turn signal status, anti-skid brake system (ABS) status and performance, and geographic positioning information.

Referring to FIG. 3, the display and sensor section 600 provides information from the vehicle sensors 4a to the microcontroller 510 for use in calculating the hazard level presented by targets indicated from the received radar signal. In the preferred embodiment of the present invention, each of the sensors are coupled to the system processor 107 which controls both the obstacle detection and collision avoidance system, and the operational event recording system. In the preferred embodiment of the present invention, the sensors are sampled or "polled" in known fashion. However, any means for reading the sensors is within the scope of the present invention. For example, the sensors may cause an interrupt to the microcontroller 510 within the digital electronics section 500 of the system processor 107 at intervals. When the microcontroller 510 recognizes the interrupt, the microcontroller 510 reads the output of the sensor 4a that is responsible for generating the interrupt. Furthermore, it is within the scope of the present invention to include a discrete processor that is dedicated to monitoring each of the sensors and storing the output of each in the ERA. Recording some or all of the data collected from each of the sensors would make accident reconstruction more reliable and less expensive.

Radar System

In addition to the information that is gathered by the sensors 4a, information is also gathered by the radar system of the preferred embodiment of the present invention.

1. Antenna/microwave transceiver section

Figure 4:
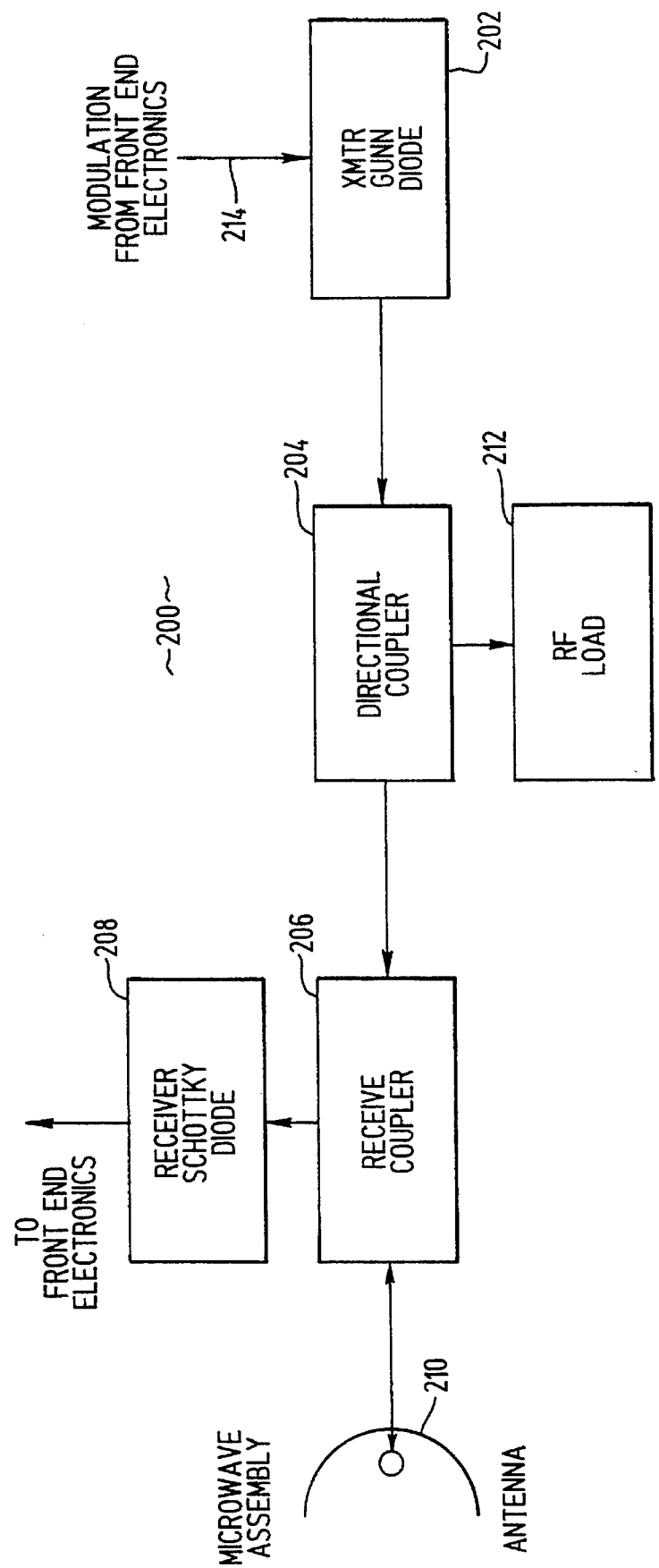
FIG. 4 is a block diagram of the antenna/microwave transceiver section of the vehicular radar system of the present invention.

FIG. 4 shows the antenna/microwave transceiver 200 in greater detail. The transceiver 200 is relatively conventional, and includes an oscillator 202, such as a Gunn diode used in the preferred embodiment of the present invention, a directional coupler 204, a receive directional coupler 206, a Schottky diode mixer 208, an antenna 210, and an RF load 212. The Gunn diode 202 produces a transmit signal. The frequency of the transmit signal varies as a function of a frequency control voltage signal 406 coupled to the Gunn diode 202 from the front end electronics section 300 on a frequency control voltage signal line 214 (see the timing diagram of FIG. 6). The voltage level that is presented to the Gunn diode 202 on the frequency control voltage signal line 214 alternates between two voltage levels, thereby causing the transmit frequency to alternate between two frequencies. In the preferred embodiment of the present invention, these two frequencies are approximately 24.125 GHz and 24.125250 GHz. The lower of these frequencies is hereafter referred to as the channel 1 frequency, and the higher frequency as the channel 2 frequency. The channel 1 and channel 2 frequencies are spaced approximately 250 kHz apart in the illustrated embodiment.

The transmit signal is coupled through the transmit directional coupler 204 to the antenna 210 via the receive directional coupler 206. The directional coupler 204 reduces the power of the transmit signal and isolates the Gunn diode 202 from received signals. The output power may be reduced to comply with current Federal Communication Commission regulations. An RF load 212 may be used to absorb excess power that is coupled away from the antenna 210. The receive directional coupler 206 couples signals received by the antenna 210 to the mixer 208 and further isolates the Gunn diode 202 from the received signals. In addition, the receive coupler 206 couples a portion of the transmit signal to the mixer 208. The mixer 208 produces an output that has frequencies equal to the difference between the frequency of the transmit signal and the frequencies of the received signals, i.e., the RF mixer 208 "down converts" the received signals. (It should be understood that the receive signal may at times have a lower frequency than the transmit signal. Throughout this document the phrase "down convert the received signals" is applied to this case as well as to the case in which the received signals have a greater frequency than the transmit signal). Other frequencies are also produced by the mixer 208. However, these other frequencies are not of interest and are filtered out at various points within the system, as discussed below.

When a target is present, the target reflects some of the transmitted signal back into the transceiver antenna 210. Targets that move at different speeds generate different reflected frequencies. For example, the frequency of an RF signal increases when reflected off an approaching target, and decreases when reflected off a retreating target. The frequency change is due to the well-known Doppler shift phenomenon. Therefore, the output of the mixer 208 is, in many cases, the difference between the frequencies of the transmitted signal, and a summation of reflections of the transmitted signal, each Doppler shifted by a different amount and a variety of other signals received signals generated by sources other than the present invention and having various frequencies.

2. Front end electronics section

Figure 5:
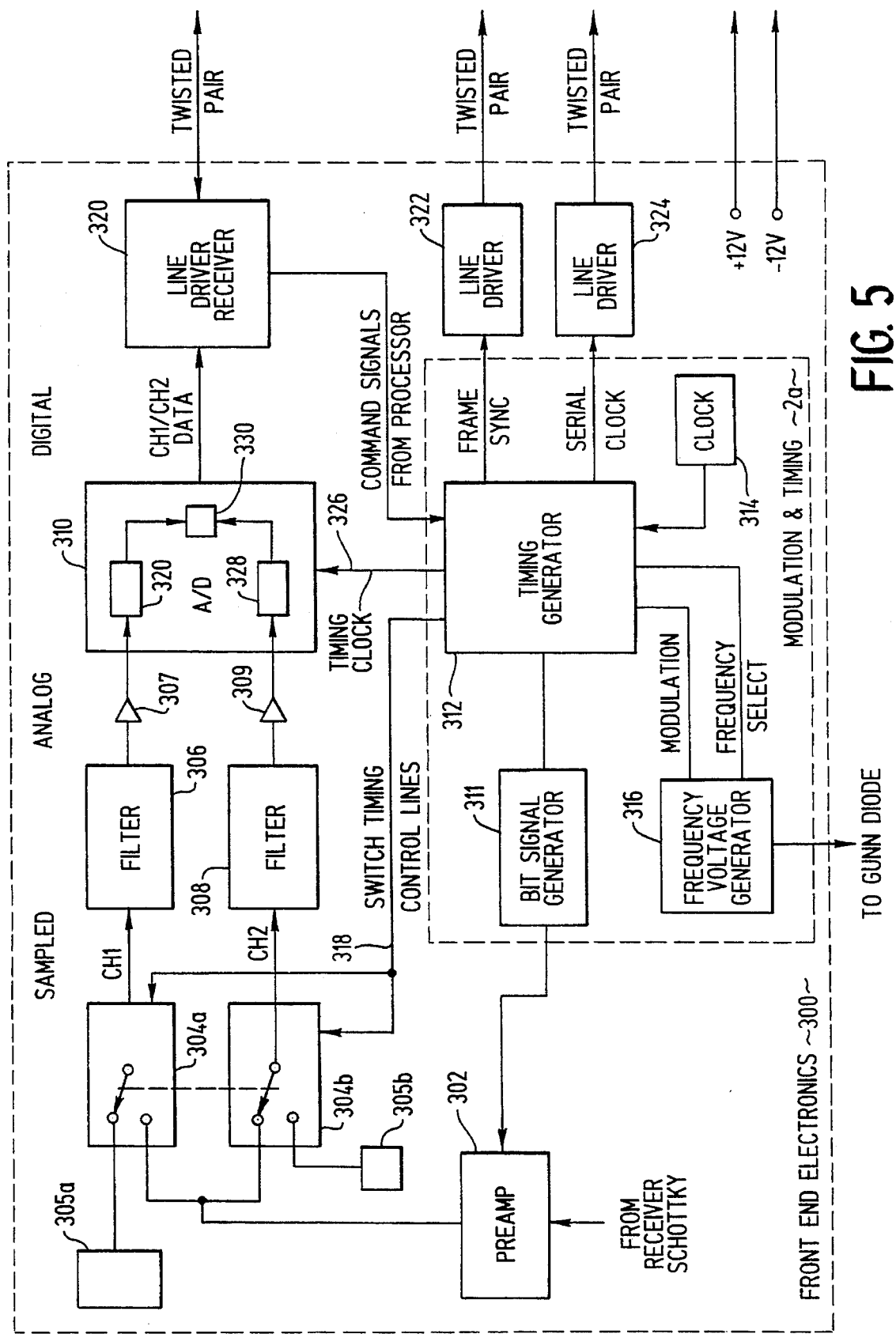
FIG. 5 is a block diagram of the front end electronics section of the vehicular radar system of the present invention.

The output of the mixer 208 is coupled to the front end electronics section 300. The front end electronics section 300 is shown in greater detail in FIG. 5. The front end electronics section 300 includes a preamplifier (preamp) 302, a channel 1 signal switch 304a, a channel 2 signal switch 304b, a channel 1 low pass filter 306, a channel 1 audio amplifier 307, a channel 2 low pass filter 308, a channel 2 audio amplifier 309, an analog to digital converter (A/D) 310, a BIT (Built-In-Test) signal generator 311, timing generator circuit 312, a clock circuit 314, a frequency control voltage generator 316, and various line drivers and receivers 320, 322, 324.

The output of the mixer 208 is coupled to the input of the preamp 302 within the front end electronics section 300. The preamp 302 amplifies the signal coupled from the mixer 208. The signal that is presented to the preamp 302 is a composite of the various signals that are received and mixed with the transmit frequency. Typically, when the transmit frequency is transmitted, a plurality of targets reflect some of the signal back to the antenna 210. Some of those targets may be stationary with respect to the antenna 210, while others may have a relative motion with respect to the antenna 210. By virtue of the Doppler shift that occurs when a radio wave is reflected off a target in motion relative to the transmitter or receiver, the frequency difference between the transmit frequency and the receive frequency can be used to determine the relative speed of the target and to distinguish one target from another, assuming there is a difference in the relative speed of the targets.

A target with a relative speed of 100 miles per hour with respect to the transmitter causes the frequency of the receive signal with respect to the transmit signal to shift by approximately 7.2 kHz. The frequencies that are of interest in the preferred embodiment of the present invention are those frequencies that are within the frequency range of about 0 to 7.2 kHz. Since the received signal is a composite of a signals reflected off a number of targets, the receive signal typically will not be a single sinusoid. Of course, higher frequencies could be used.

The strength of the transmitted signal is such that most targets of interest are detected at ranges up to about 1600 feet. The speed at which radio frequency waves propagate through free space is approximately 1 ft/ns. Therefore, at a distance of 1600 feet, there is a round-trip signal delay of about 3.2 µS. Hence, when a received signal is reflected off a target at a distance, the output of the mixer 208 has a frequency of 250 kHz, plus or minus the Doppler frequency, for the amount of time that it takes the transmit signal to reach the target and reflect back to the transceiver (i.e., 3.2 µS for a range of 1600 feet) immediately after the transmit frequency changes from the channel 1 frequency to the channel 2 frequency, and vice versa.

The output of the preamp 302 is coupled to both the signal switches 304a, 304b. The signal switches 304a and 304b time demultiplex the signal from the preamp 302 by coupling the preamp 302 to either the channel 1 audio amplifier 307 and low pass filter 306, or the channel 2 audio amplifier 309 and low pass filter 308, alternatively. Additionally, each signal switch couples the input of the associated filter 306, 308 to a circuit 305a, 305b having an output impedance equal to the output impedance of the preamp 302 (and the input impedance of each filter 306, 308). Thus, a constant source impedance is seen by the filters 306, 308. By ensuring that the source impedance to each filter remains constant, the filters remain linear and so the power of the intermodulation products of the Doppler frequencies of multiple targets created by the nonlinearity of the filters are held to a minimum (and ideally, eliminated). Such intermodulation products, when created, appear as "phantom" targets.

Figure 6:
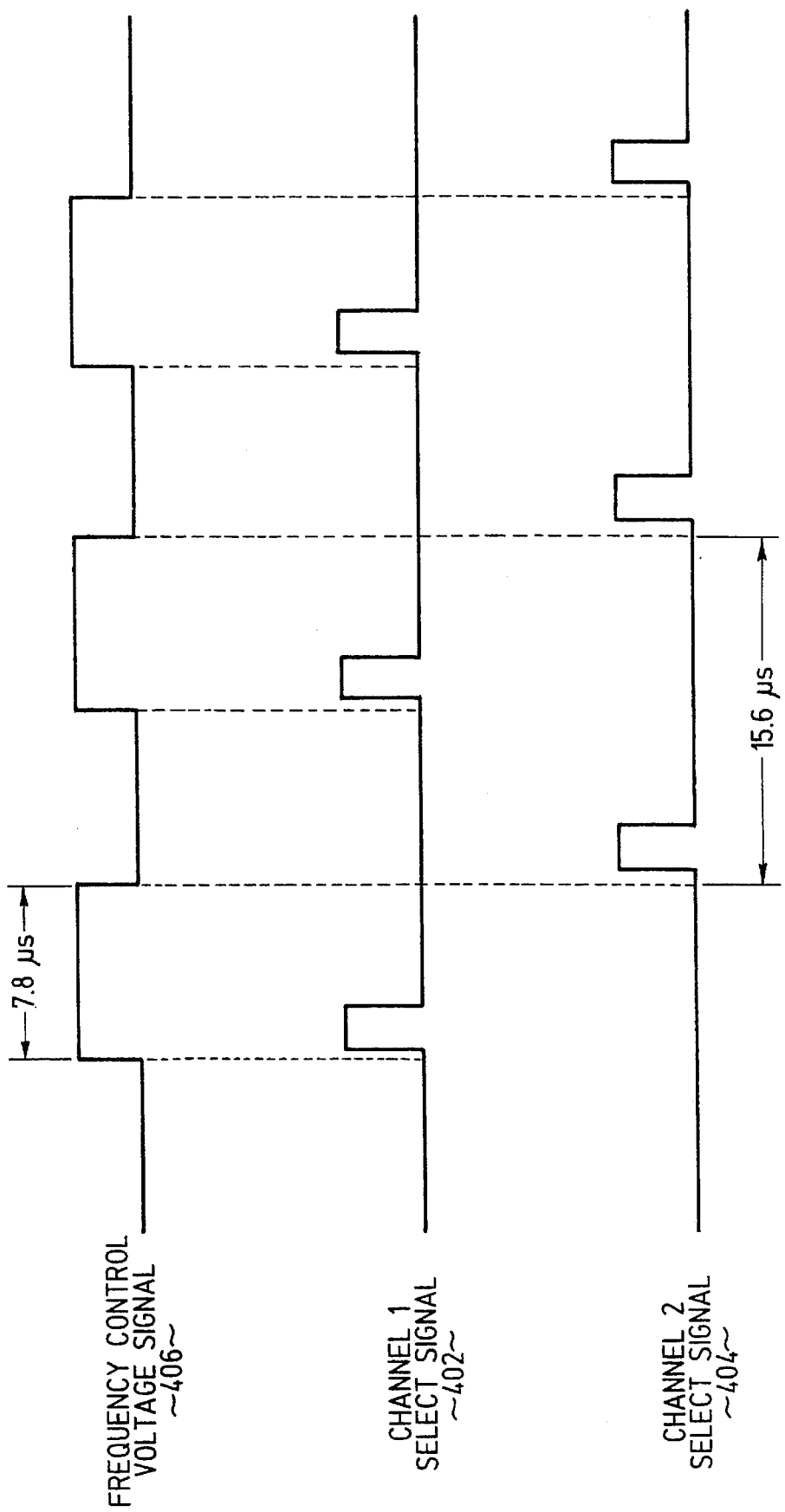
FIG. 6 is a timing diagram of the frequency control voltage signal referenced to the channel 1 and channel 2 select signals.

Paired switch timing control signals 402, 404, coupled to respective paired signal switches 304a, 304b from timing generator circuit 312 on switch timing control lines 318, determine to which filter 306, 308 the preamp 302 output is to be coupled, and the timing of such coupling. FIG. 6 is a timing diagram showing the timing of the switch timing control signals 402, 404 with respect to the frequency control voltage signal 406 coupled to the Gunn diode 202 on the frequency control voltage signal line 214. In the preferred embodiment of the present invention, the frequency control voltage signal 406 alternates between a relatively high voltage and a relatively low voltage at intervals of 7.8 µS. One period of the frequency control voltage signal 406 is equal to 15.6 µS. Therefore, the output frequency of the Gunn diode 202 alternates between a relatively low frequency (the channel 1 frequency) and a relatively high frequency (the channel 2 frequency) at intervals of 7.8 µS as a function of the frequency control voltage.

The switch timing control signal on switch timing control line 318 includes a channel 1 select signal 402 and a channel 2 select signal 404. The channel 1 select signal 402 in the high state causes the preamp 302 output to be coupled to the channel 1 low pass filter 306 through the signal switch 304. The channel 2 select signal 404 in the high state causes the preamp 302 output to be coupled to the channel 2 low pass filter 308 through the signal switch 304. The signal switch 304 is synchronized to the frequency control voltage signal 406 by the timing generator circuit 312. Therefore, in the preferred embodiment of the present invention, the signal switch 304 connects the preamp 302 to the channel 1 low pass filter 306 for approximately one-fifth of a period (3.12 µS), synchronized to the time when the transmit signal is at the channel 1 frequency. The signal switch 304 also connects the preamp 302 to the channel 2 low pass filter 308 for approximately one-fifth of a period (3.12 µS), synchronized to the time when the transmit signal is at the channel 2 frequency. Hence, the signal switch 304 time demultiplexes the down converted channel 1 and channel 2 signals. Alternative embodiments, in which the length of the channel 1 and channel 2 select signal 402, 404 pulses are longer or shorter, are within the scope of the present invention.

The timing diagram of FIG. 6 shows the channel 1 select signal 402 pulses and the channel 2 select signal 404 pulses offset from the respective edges of the frequency control signal 406 to allow the transmit signal time to stabilize and/or to ensure that the receive and the transmit signal are at the same carrier frequency (i.e., both the receive and transmit signals are at either the channel 1 or channel 2 frequency) at the time the channel 1 and channel 2 select signals 402, 404 are active. However, it should be understood that in alternative embodiments of the present invention, these signals 402, 404 may occur anywhere at or between the rising edge and the falling edge of the frequency control voltage signal 406.

Figure 7:
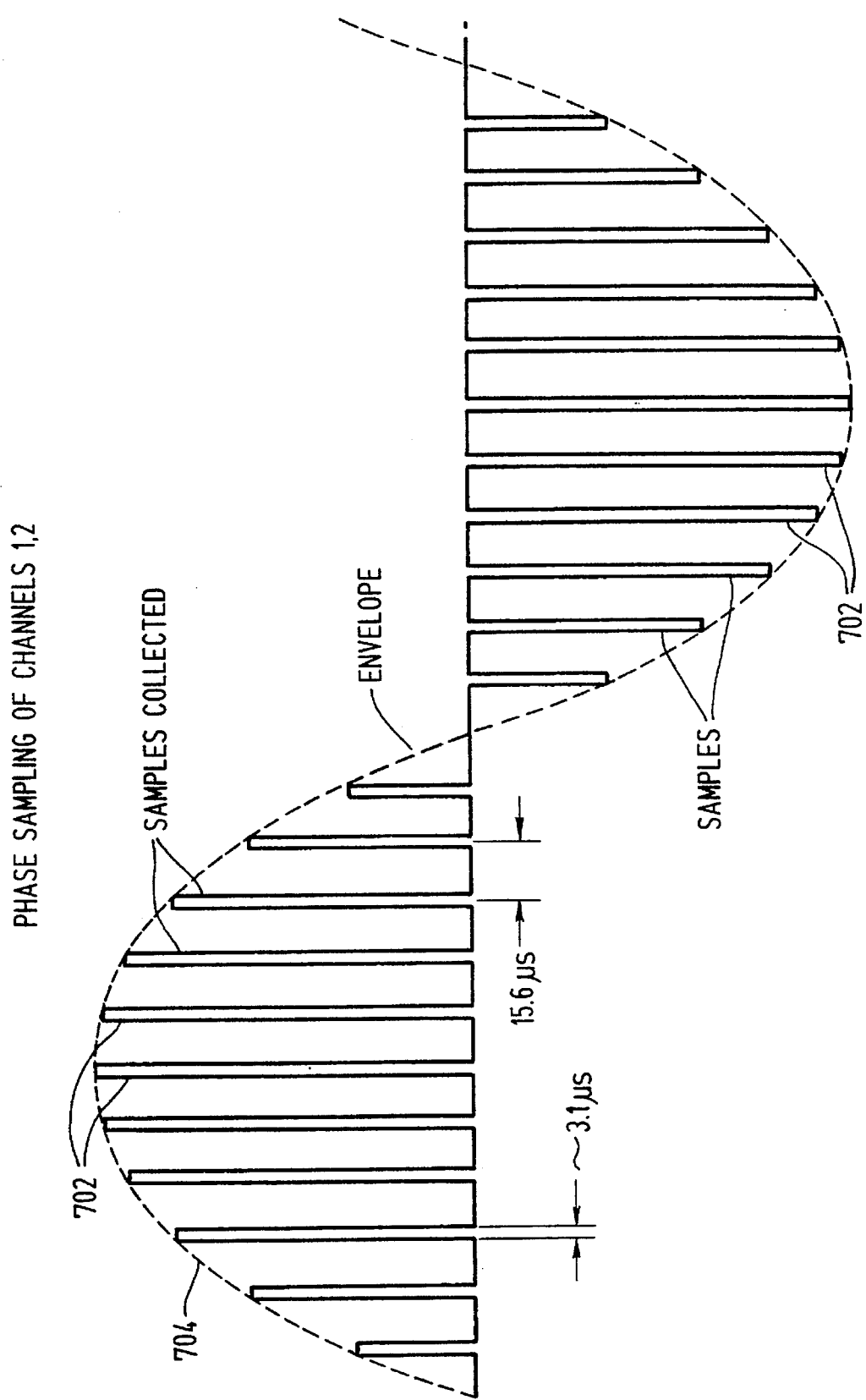
FIG. 7 is an illustration of the envelope of the output of one channel of the signal switch of the vehicular radar system of the present invention.

In the preferred embodiment of the present invention, each filter 306, 308 has a 3 dB cutoff frequency of 24 kHz. The filters 306, 308 reconstruct the output of the signal switch 304 by acting as an envelope detector. The channel 1 low pass filter 306 reconstructs (or "smooths") the time demultiplexed down converted channel 1 signal and the channel 2 low pass filter 308 reconstructs the time demultiplexed down converted channel 2 signal, as shown for one channel in FIG. 7. The composite of the samples 702 taken by the signal switch 304 under the control of the channel 1 select signal 402 and the channel 2 select signal 404 creates an envelope 704 for each channel that is essentially below the 3 dB cutoff frequency of the low pass filters 306, 308. Therefore, the output of each filter is a smooth signal with frequency components equal to the difference between the frequency of the transmit signal corresponding to the channel associated with the filter and the frequency of each signal received during the time that channel is transmitted. For example, the channel 1 low pass filter 306 outputs a smooth signal with a frequency equal to the difference between the channel 1 transmit frequency and the channel 1 receive frequencies reflected from a multitude of targets as if the channel 1 transmit frequency were transmitted in a continuous wave fashion.

The outputs of each filter 306, 308 are coupled to the A/D converter 310. The A/D converter 310 includes two discrete channels corresponding to front-end signal channels 1 and 2. Each channel of the A/D converter 310 converts the analog inputs from the corresponding down-converted frequency channel into a stream of digital data words. A digital low pass filter 328 within the A/D converter 310 filters each channel, and a multiplexer 330 within the A/D converter 310 time multiplexes the digital data words from each of the A/D converter channels (i.e., channel 1 and channel 2 digital data words are interleaved). The low pass filters 328 within the A/D converter 310 have a 3 dB cutoff frequency of approximately 7.5 kHz. These filters 328, in conjunction with low pass filters 306, 308, ensure that the Nyquist criteria is satisfied with respect to the sample frequency, thereby preventing aliasing when the FFT operation is performed (i.e., the effective sampling frequency from the A/D converter 310 should exceed twice the frequency of the doppler frequency of interest).

The A/D converter 310 of the preferred embodiment of the present invention is an oversampling analog to digital converter. The output from the A/D converter 310 is a series of 32 bits data words. The first 16 bits represent the amplitude of the analog signal sampled at a particular time (i.e., 16 bit resolution). Bits 17 through 19 indicate whether the A/D converter 310 is near saturation. Bits 20 through the 31 indicate whether the word is associated with channel 1 or channel 2. Knowledge of the proximity of the A/D converter 310 to saturation aids in compensating for any signal distortion that might occur as the A/D converter 310 approaches saturation. Such compensation may be performed in a number of ways that are well known in the art of digital signal processing, such as using automatic gain control corresponding to each value represented by the last three bits of the A/D converter 310 output. In alternative embodiments of the present invention, the output of the A/D converter 310 is merely the digital representation of the input plus one bit that represents the channel of the A/D converter 310. The A/D converter 310 output in such alternative embodiments may have fewer or more than 16 bits of resolution.

The Timing generator circuit 312 determines the sample rate of the A/D converter 310. In the preferred embodiment of the present invention, the A/D converter 310 has a sample frequency of about 1 MHz, as determined by a timing clock signal coupled from the timing generator circuit 312 to the A/D converter 310 on a timing clock line 326. The A/D converter 310 of the preferred embodiment of the present invention oversamples by 64×, and thus has an equivalent sample rate equal to ($\frac{1}{64}$) MHz=16 kHz. In an alternative embodiment of the present invention, the sample rate can be changed dynamically.

The preferred embodiment of the present invention has a real-time Built-In-Test (BIT) capability which verifies the proper operation of the system. The BIT signal generator circuit 311 creates a BIT signal upon receiving a command from the timing generator circuit 312. The BIT signal is coupled to the preamp 302 and simulates a signal from the mixer 208. When the BIT signal is injected into the preamp 302, it is summed with the output of the mixer 208. Therefore, the ongoing operations need not be interrupted. In the preferred embodiment of the present invention, the microcontroller 510 (shown in FIG. 8) determines which frequency is to be injected into the preamp 302. The determination is made based upon the absence of other targets. Therefore, normal operation of the system is not impeded by the BIT function. The BIT signal injected into the preamp 302 propagates through the system along with the output of the mixer 208. The microcontroller compares the range and relative motion expected by the microcontroller 510 for the BIT signal with the values of range and relative motion that actually result after the BIT signal propagates through the front-end electronics. Thus, a high degree of certainty that each component in the front end electronics section 300 and the digital electronics section 500 are operating properly can be had.

The timing generator circuit 312 of the preferred embodiment of the present invention also generates a calibrate signal which is coupled to the A/D converter 310. The calibrate signal initiates a calibrate function within the A/D converter 310 which calibrates the A/D converter 310 for selected offsets. Offset calibration of the A/D converter 310 is performed periodically to ensure the accuracy of the conversion. Calibration functions, such as the calibration function of the preferred embodiment of the present invention, are standard features of many A/D converters, such as the CS5336 A/D converter manufactured by Crystal Semiconductor and used in the preferred embodiment of the present invention.

3. Digital electronics section

The digital output of the A/D converter 310 is coupled to a signal line driver/receiver 320. The line driver/receiver 320 couples the digital signal to the digital electronics section 500. The digital electronics section 500 is shown in greater detail in FIG. 8. A signal line driver/receiver 502 receives the digital output of the A/D converter 310. The signal line driver/receiver 502 is coupled to a field programmable gate array (FPGA) 504, such as a 3042PC84-70 FPGA manufactured by Xilinx. The FPGA 504 accepts the digital data sent from the A/D converter 310 and stores the data in a high-speed random-access-memory 506 (RAM).

The digital data sent from the A/D converter 310 is sent as a synchronous serial data stream to the FPGA 504. A frame synchronization (frame sync) signal and a serial clock (bit sync) signal are generated by the timing generator circuit 312 and transmitted to the FPGA 504 from the front end electronics section 300. The frame sync and serial clock signals are coupled from the timing generator circuit 312 to line drivers 322, 324. The line drivers 322, 324 of the front end section 300 are coupled to line receivers 516, 518, respectively, in the digital electronics section 500. From the line receivers 516, 518, the frame sync and serial clock signals are coupled to the FPGA 504. The frame sync signal identifies the beginning of each digital data word transmitted from the A/D converter 310 to the FPGA 504, and the serial clock signal synchronizes each bit of each digital data word from the A/D converter 310 to the input circuit of the FPGA 504. The generation and use of frame synchronization and serial clock signals to communicate synchronous digital data is well known in the art.

Figure 9:
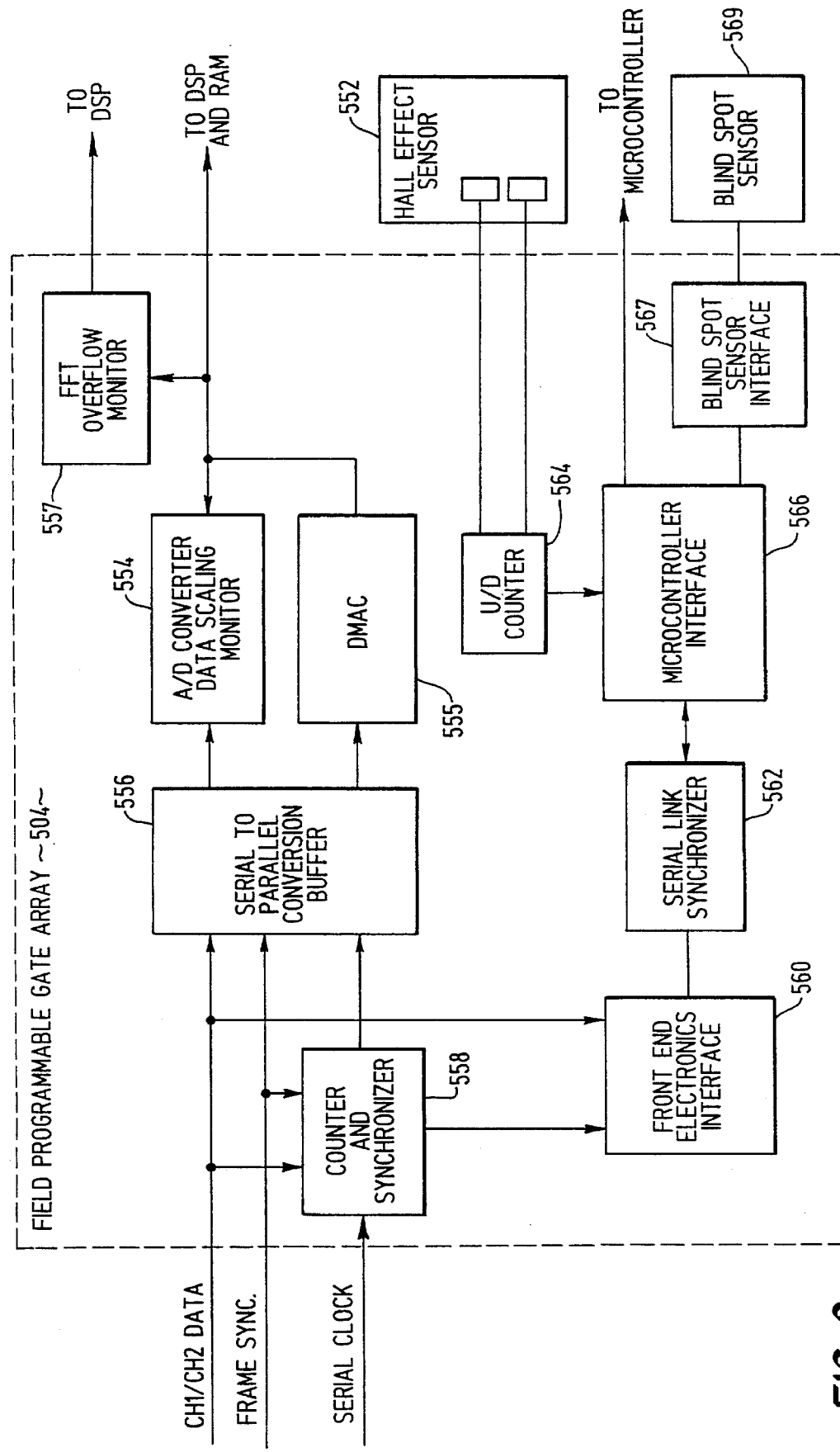
FIG. 9 is a block diagram of the field programmable array of the vehicular radar system of the preferred embodiment of the present invention.

FIG. 9 is a detailed block diagram of the FPGA 504. In the preferred embodiment of the present invention, a direct memory access controller 555 (DMAC), a counter and synchronizer 558, a serial link synchronizer 562, a front end electronics interface 560, a microcontroller interface 566, an up/down counter 564, a serial to parallel conversion buffer 556, an analog-to-digital data-scaling monitor 554, a blind spot sensor interface, and an FFT overflow monitor 557 are implemented in the FPGA 504. The serial to parallel conversion buffer 556 receives the stream of serial data words from the A/D converter 310 along with the frame synchronization and serial clock signals. The counter and synchronizer circuit 558 counts the number of bits being received by the parallel to serial conversion buffer 556 and couples the serial clock signal to the serial to parallel conversion buffer 556. The serial to parallel conversion buffer 556 converts the serial stream to a parallel format. Each data word sent from the A/D converter 310 includes 32 bits, 16 of which represent the amplitude of the samples taken during a particular sample period. The 16 amplitude bits, together with 8 bits set to a known value, such as zero in the preferred embodiment of the present invention, form a 24 bit parallel word.

The FPGA 504 is coupled to a Digital Signal Processor 508 (DSP), such as model DSP56001 manufactured by Motorola Incorporated. The DSP 508 is coupled to a clock 514 that determines the speed at which the DSP 508 operates. The DSP 508 of the preferred embodiment of the present invention operates at approximately 26 MHz. When a complete 32 bit word has been received from the A/D converter 310, the DMAC 555 initiates a DMA (direct memory access) cycle by asserting a bus-request signal to the DSP 508. When this signal is asserted, the DSP 508 releases a bus 509 shared by the FPGA 504, DSP 508, and the RAM 506. When the DSP 508 is off the bus 509, the DSP 508 asserts a bus-grant signal to the DMAC 555, indicating that the DMAC 555 is granted the use of the bus 509. The DMAC 555 directly writes the 16 bit digitized sample as a 24 bit word to the RAM 506. The lower 8 bits are zero filled. When the DMAC 555 is finished with the write to the RAM 506 the DMAC 555 de-asserts the bus-request signal, thereby allowing the DSP 508 to regain control of the bus 509.

The RAM 506 locations in which the data is written by the DMAC 55 are divided into blocks. Each block of data has two memory areas, each of which are capable of storing 512 words. Each of the memory areas within each block of memory is associated with one of the front-end signal channels. Initially, the DMAC 555 is disabled until the DSP 508 initializes the DMAC 555 by writing the block address of the block of memory in the RAM 506 to which the words are to be stored.

The DMAC 555 reads a channel bit from each serial word and writes the word to the memory area associated with the channel designated by that channel bit. The channel bit alternates with each word read by the DMAC 555, and thus the memory area to which the word is written alternates causing the memory areas associated with each channel to fill concurrently. The DMAC 555 has an internal counter with a maximum count of 511. Each time a word from channel 2 is written to memory, the counter is incremented. To ensure that the counter is synchronized to the write operation, the first increment only occurs after both memory areas have been written to at least once (i.e., if channel 2 is written to before channel 1, the counter does not increment until the second time data is written to channel 2). This causes the first word that was written to channel 2 to be overwritten, however, the benefit of ensuring that each word is current is greater than the benefit of ensuring that no data is dropped.

When the counter reaches a terminal count of 511 (i.e., each of the memory areas are full) the counter returns to zero and the DMAC 555 interrupts the DSP 508. The DSP 508 updates the DMAC 555 with the block address of the next block of memory to which the next series of words is to be written. Thus, the DSP 508 determines the number of samples that have been acquired. The DSP 508 determines the number of samples to be used in an FFT to be performed by the DSP 508 based upon the number of samples acquired.

Each time the FPGA 504 asserts the bus-request signal, the A/D converter data scaling monitor 554 monitors the word to be written to the RAM 506. The A/D converter data scaling monitor 554 determines the greatest absolute magnitude for all of the words in the block. Each word is in two's complement format, and so the most significant bit determines whether the value is positive or negative (i.e., is the "sign" bit). The word that has the greatest absolute magnitude also has the least number of "guard" bits. Guard bits are those consecutive bits which are adjacent to, and have the same logic level as, the sign bit. These consecutive bits are referred to as guard bits because they guard the data from overflowing registers within the DSP 508 as digital processing functions, such as FFT operations, are performed. The number of guard bits contained in the word having the fewest guard bits is recorded as a scaling indicator associated with the each memory area of each block to be written. The scaling indicator is stored along with each block of data in the RAM 506.

For example, assume that one memory area of length 5 contained the following words: 00001010; 11110101; 00101011; 00011101; 00010101. The word "00101011" has only two guard bits, whereas each of the other words have at least 3 guard bits. Therefore, the scaling indicator for this memory area would indicate a value of 2 guard bits. Thus, indicating to the DSP 508 how to scale the data to guaranty that no registers overflow in the FFT operation.

All communications between the microcontroller 510 and the timing generator circuit 312 are routed through the microcontroller interface 566, the serial link synchronizer 562, and the front end electronics interface 560, within the FPGA 504. The front end electronics interface 560 and the microcontroller interface 566 are standard interface circuits, such as are well known in the art. The serial link synchronizer 562 serves as a buffer between the microcontroller 510 and the front end electronics section 300. The serial link synchronizer 562 receives each instruction in serial form from the microcontroller 510, and synchronizes the instruction for transmission to the timing generator circuit 312 via the line driver/receiver 502 and the line driver/receiver 320, in known fashion. Such communications include instructions to the timing generator circuit 312 to initiate an A/D converter calibration procedure, instruction to the timing generator circuit 312 to initiate a BIT, instruction to change carrier frequency if interference is detected, etc. Such instructions are transmitted from the microcontroller 510 to the FPGA 504.

In the preferred embodiment of the present invention, the FPGA 504 also determines a variety of vehicle conditions, such as the position of the vehicle steering wheel. The FPGA 504 receives data from a dual Hall-effect sensor 552 which sense the location of a magnet on the steering wheel shaft. In the preferred embodiment of the present invention, an up/down counter 564 implemented in the FPGA 504 counts the revolutions (or partial revolutions, for finer position determination) of the steering wheel to determine the position of the steering wheel. That is, each time the steering wheel is turned one full rotation the counter is incremented. As the steering wheel is returned to a position that would direct the vehicle in a straight line, each full rotation causes the counter to decrement back toward zero. Information regarding the position of the steering wheel is communicated directly to the microcontroller 510 from the FPGA 504. The FPGA also has a blind spot sensor interface 567 that digitally conditions those signals, then communicates directly to the microcontroller 510.

4. FFT Computation

When sufficient data is present in the RAM 506, the DSP 508 performs an FFT operation that maps the digital representation of the time-demultiplexed receive signal from the time domain into the frequency domain (i.e., performs a spectral analysis of the signal and determines the frequencies and phase that are present and the relative power at each frequency). Performing FFT operations using digital signal processors, such as the DSP56001 used in the preferred embodiment of the present invention, is well known in the art as is demonstrated in Implementation of Fast Fourier Transforms on Motorola's DSP56000/DPS56001 and DSP96002 Digital Signal Processors, Guy R. L. Sohie (published by Motorola Inc., 1991).

Before performing the FFT, the DSP 508 determines the scaling factor to be used (i.e., the number of bits left or right to shift the data) by reading each of the scaling indicators associated with each memory area within each block of data transmitted from the FPGA 504 to the RAM 506. The DSP 508 shifts all the data in each block either to the right or to the left an equal amount, such that the word having the least number of guard bits has exactly two high order guard bits after the shift (scaling) is complete.

For example, if an FFT is to be calculated using 1024 points (i.e., two blocks of data from the RAM 506 including 1024 samples from channel 1 and 1024 samples from channel 2), two scaling indicators are read. Each scaling indicator is associated with two blocks of 512 words, one block associated with each channel. If the scaling factors associated with each memory area of each block indicate values of 1 and 3 respectively, then each word of each block is shifted to the right one bit. This ensures that the word with the least number of guard bits has exactly two guard bits before the FFT calculation is started. Thus, overflow errors are eliminated. In contrast, if the values of the scaling indicators associated with the blocks were 3 and 5 respectively, each word of each of the two blocks is shifted to the left one bit to ensure that each word that had three guard bits in the blocks with a scaling factors of 3 now has exactly two guard bits. Thus, truncation errors are minimized.

This process of scaling the values of each block of words is called a "block floating point operation". The purpose of the block floating point operation is to provide the greatest accuracy in the calculation of the FFT, while ensuring that the results of the calculations do not overflow the registers in which they are stored. Because the DSP of the preferred embodiment of the present invention is not a floating point processor, such block floating point operations are necessary. However, block floating point operations are not necessary in processors which perform true floating point calculations. A digital signal processor which has true floating point capabilities could be used in an alternative embodiment of the present invention.

The FFT overflow monitor 557 performs block floating point scaling monitor operations on data that results from intermediate calculations performed by the DSP 508 during the process of calculating the FFT. These block floating point scaling monitor operations ensure that the intermediate products from the FFT operation do not overflow those registers within the DSP 508 which hold them.

Since the DSP 508 is capable of performing an FFT operation on complex numbers, the FFT operation is linear, and the operation is being performed on data having only real values, both channels of data from the A/D converter 310 are transformed in a single operation. Thus, both channels can be transformed in nearly the same amount of time required to transform only one channel. This procedure in particular, as well as FFT operations in general, are explained in greater detail in Introduction to Digital Signal Processing, John G. Proakis and Dimitris G. Manolakij, at pg. 720 et al., which is hereby incorporated by reference.

The DSP 508 circuit used in the preferred embodiment has one register set ("real register set") that is intended to accommodate the real portion of each sample, and a second register set ("imaginary register set") that is intended to accommodate the imaginary portion of each sample. Because the samples from each channel are real, the imaginary portion is zero. Therefore, normally when performing an FFT operation on such real data, the imaginary registers initially would be set to zero. However, instead of loading the samples from channel 1 into the real register and setting the imaginary registers to zero, the real samples from channel 2 are loaded into the imaginary registers. When the FFT is completed, the results can be separated to produce the transform of each of the two sequences by applying the formula: $X_1(k)=[\frac{1}{2}][X(k)+X^*(N-k)]$, and $X_2(k)=[\frac{1}{2}j][X(k)-X^*(N-k)]$; where $X(k)$ is the FFT of $x(n)$, $X_1(k)$ is the FFT of the sequence of samples from channel 1, $X_2(k)$ is the FFT of the sequence of samples from channel 2, $X^*(k)$ is the complex conjugate of $X(k)$, and N is the number of samples in each sequence.

Performing the FFT transforms the channel 1 and channel 2 digital data from the time domain to the frequency domain. Therefore, the result of the FFT operation is a list of frequencies and the power associated with each such frequency. The result of the FFT is periodic, having a period that is equal to the sampling frequency. In the preferred embodiment of the present invention, the sampling frequency is 15 kHz. Therefore, the range of frequencies into which the time domain signal is mapped is equal to the sample frequency. When the power at a particular frequency is greater than a selected threshold amount, the DSP 508 determines that a target is present.

By counting the number of frequency peaks at which power is detected to be over the threshold, the DSP 508 determines how many targets are present (i.e., how many targets are moving at different speeds). Targets that are moving at the same speed reflect signals that have the same frequency. Such targets are not distinguishable one from another. In the illustrated embodiment, targets must differ in speed by at least ¼ MPH (a Doppler shift of 18 Hz at a carrier frequency of 24,125 GHz) to be individually identified. This limitation is fixed by the resolution with which the DSP 508 can discriminate between frequencies. In an alternative embodiment in which the DSP 508 has greater resolution, the ability to distinguish targets is greater.

The DSP 508 also determines the phase relationship of the channel 1 signal to the channel 2 signal. This can be easily determined by applying the formula, ARCTAN $[\{(B\times C)-(A\times D)\}/\{(A\times C)+(B\times D)\}]=\phi$(difference in phase), where A=the value of the real portion of the transformed channel 1 signal, B=the value of the imaginary portion of the transformed channel 1 signal, C=the real portion of the transformed channel 2 signal, and D=the value of the imaginary portion of the transformed channel 2 signal. Separate registers within the DSP 508 contain the real and imaginary values for the transformed channel 1 and channel 2 signals, making it a simple matter to implement the above formula to determine the phase relationship between the channel 1 and channel 2 signals at each frequency. Using a greater number of samples provides greater accuracy in determining the phase relationship. Using 4096 samples yields phase information with sufficient resolution to determine the range with an resolution of 0.25 ft.

Figure 10:
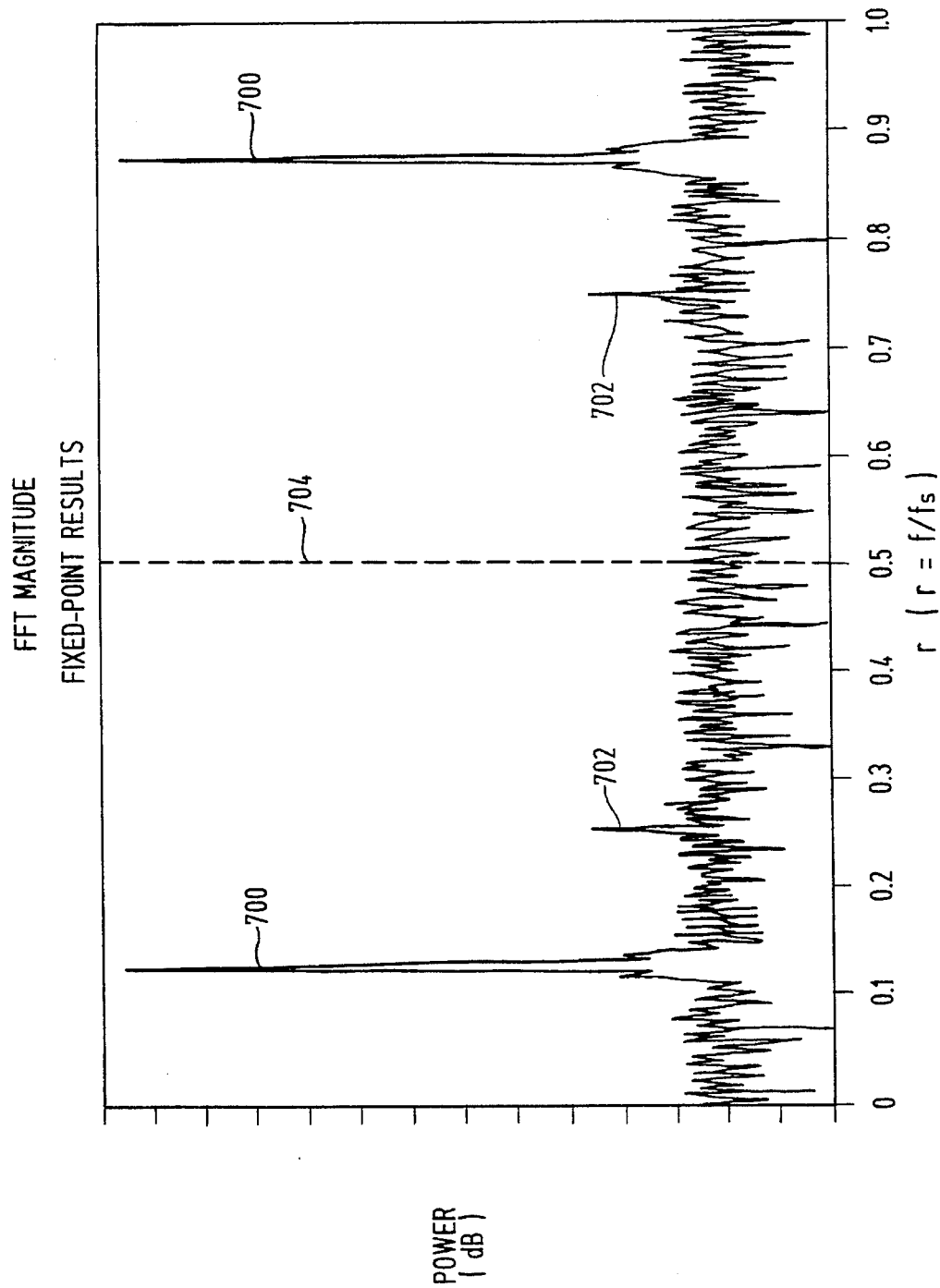
FIG. 10 is a graph of the results of a fast Fourier transform (FFT) operation as performed by the digital signal processor (DSP) of the preferred embodiment of the present invention.

FIG. 10 is a graphic representation of the result of a typical FFT operation, wherein the receive signal was reflected off two targets, one of which is moving at a relative speed of 26 MPH with respect to the vehicle on which the system was mounted, the other moving at a relative speed of 52 MPH with respect to the vehicle on which the system was mounted. The hash marks along the X-axis are spaced in increments of $(0.1\times f_s)$ Hertz, where $f_s$ is the sample frequency (in the preferred embodiment of the present invention, $f_s$=16 kHz). Power at each frequency is plotted on the Y-axis in decibels. No particular values are attached to each hash mark along the Y-axis, since the power is plotted as a relative value.

A spike 700 along the X-axis represents the target moving at a relative speed of approximately 26 MPH. The relative speed is calculated by: $V=(f_d\times C)/(2\times f_{rf})$, where V is the relative speed (velocity) of the transmitter with respect to the target, $f_d$ is the Doppler shift frequency, $f_{rf}$ is the carrier frequency, and C is the speed of light ($6.696\times10^8$ MPH). Applying this at a carrier frequency of 24.125 GHz, and $f_d=(0.125\times f_s)$, as determined from the graph of the spike 700, yields a speed of V=26 MPH. Another smaller spike 702 represents the target moving at a relative speed of 52 MPH computed in the same manner. A broken line 704 is shown at 7.5 kHz. Because the results of the FFT operation are periodic, the results to the left of the broken line 704 are mirrored on the right side of the broken line 704. (The period of the FFT is equal to $f_s$, however, because the signals are real, the power spectrum is symmetric about $f_s/2$, for $0<n<f_s$).

Figure 11:
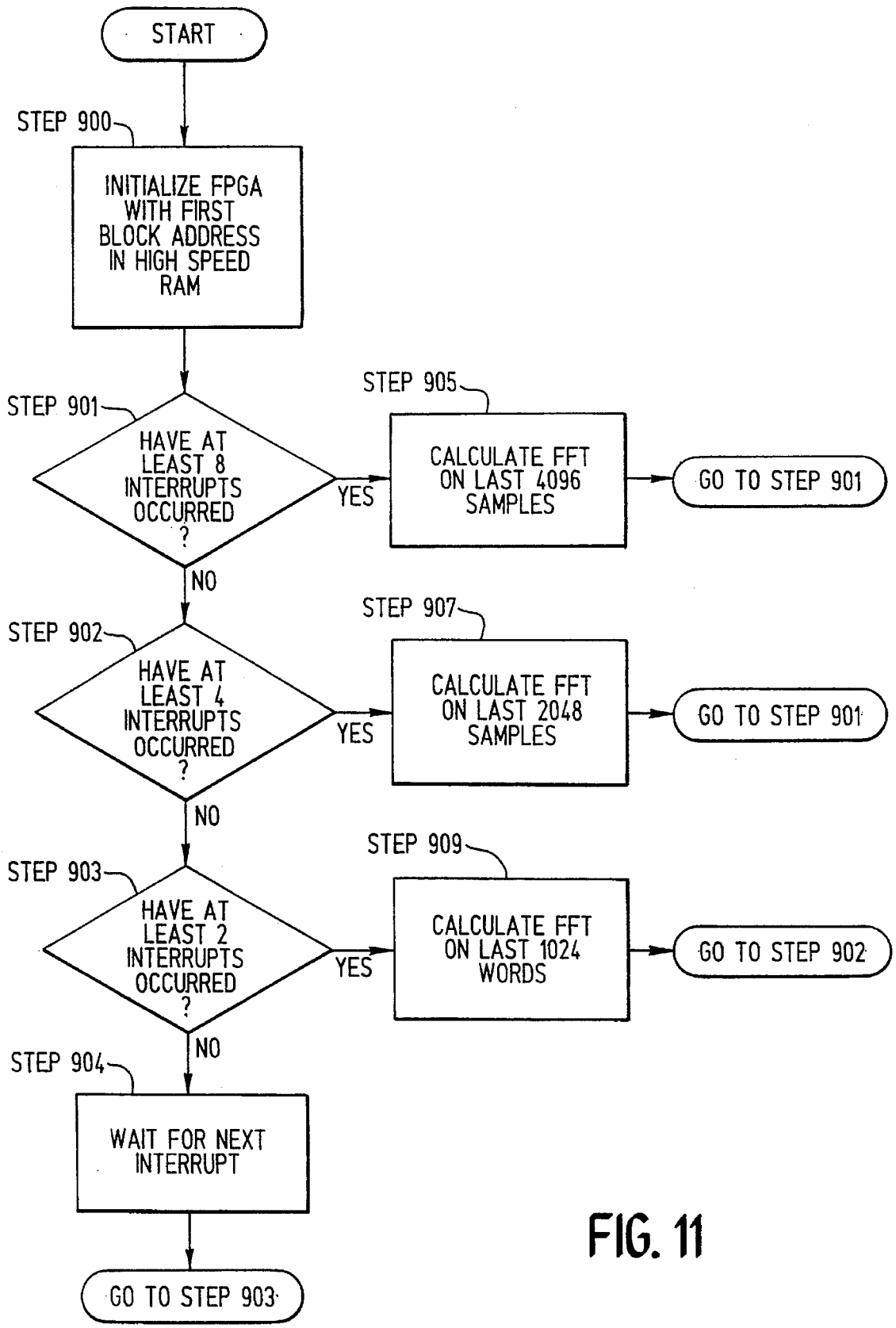
FIG. 11 is a high level flow chart of the method by which the DSP of the preferred embodiment determines the number of samples upon which to perform an FFT calculation.

FIG. 11 is a high level flow chart of the method by which the number of digital data words to be included in an FFT calculation is determined in the preferred embodiment of the present invention. Initially, the RAM 506 has no data stored and the FPGA 504 must be initialized by the DSP 508 with the location in the RAM 506 at which to begin to store the digital data sent from the A/D converter 310 to the FPGA 504 (STEP 900). Once the FPGA 504 has been initialized, the DSP 508 counts the number of interrupts that occur to determine how many samples have been stored in the RAM 506 by the FPGA 504. Each interrupt indicates that 512 samples have been stored. Immediately after the FPGA 504 has been initialized it begins collecting data from the A/D converter 310. When the FPGA 504 has stored 512 samples from each channel in the RAM 506, the FPGA 504 generates an interrupt. The DSP 508 keeps an internal counter in a register, and increments the count each time an interrupt is generated by the FPGA 504.

If there have not been at least 8 interrupts (STEP 901), the DSP 508 checks whether there have been at least 4 interrupts (STEP 902). If there have not been at least 4 interrupts, the DSP 508 checks whether there have been at least 2 interrupts (STEP 903). If there have not been at least 2 interrupts, the DSP 508 waits for the next interrupt (STEP 904). When the next interrupt occurs (i.e., 512 samples of each channel have been stored in the RAM 506), the DSP 508 checks once again whether at least 2 interrupts have occurred (i.e., whether at least 1024 samples of each channel have been stored in the RAM 506) (STEP 903). Steps 903 and 904 are repeated until the FPGA 504 has generated at least 2 interrupts.

When the second interrupt is generated, the response to the inquiry of STEP 903 is "yes", and the DSP 508 calculates an initial FFT using the last 1024 samples of each channel stored in the RAM 506 (STEP 909). When the initial FFT is complete, the DSP 508 checks whether at least 4 interrupts have been generated by the FPGA 504 (STEP 902). If less than 4 interrupts have been generated, STEPS 903 and 909 are repeated. When the response to the inquiry at STEP 902 is "yes", the DSP 508 calculates a next FFT using the last 2048 samples of each channel stored in the RAM 506 (STEP 907). Upon completion of the 2048 sample FFT of STEP 907, the DSP 508 checks whether the FPGA 504 has generated at least 8 interrupts (STEP 901). STEPS 901, 902 and 907 are repeated until at least 8 interrupts have been generated by the FPGA 504.

Once 8 or more interrupts have been generated by the FPGA 504, the DSP 508 calculates each succeeding FFT using the last 4096 samples of each channel stored in the RAM 506 (STEP 905). STEPS 901 and 905 are repeated until either the system is removed from service, or interference is encountered. If interference is encountered, the microcontroller 510 instructs the DSP 508 to change the carrier frequency, flush the samples thus far collected, and begin the process of FIG. 11 from the start, resetting the counter that counts the number of interrupts generated. Use of the samples previously collected would distort the result due to their contamination by the interference. Thus, this method of calculating the FFT provides the most accurate information regarding the nature of the targets present in the least amount of time possible, since it would require a substantially longer period of time to collect 4096 new samples from each channel.

The DSP 508 is coupled to the microcontroller 510. The microcontroller 510 is coupled to the clock 514, which determines the operational speed of the microcontroller 510. In the preferred embodiment of the present invention, the microcontroller 510 operates at approximately 16 MHz. The microcontroller 510 is also coupled to a local random access memory (RAM) 512, a battery backed RAM/Real-time clock 25, and a Flash Programmable Read Only Memory (PROM) 520. The Flash PROM 520 stores the instructions which the microcontroller 510 executes. The microcontroller 510 uses the local RAM 512 as a utility memory space in which the microcontroller 510 stores previously detected target information and a record of events.

The DSP 508 transmits to the microcontroller 510 four coded 24-bit words associated with each FFT operation. The first word indicates the number of targets present, the second word indicates the number of scaling bits, the third word indicates the magnitude of the low frequency noise floor, and the fourth word indicates the magnitude of the high frequency noise floor. The high and low frequency noise floors are determined by calculating the average of the power levels of each frequency above and below, respectively, a predetermined frequency. Following these four digital data words are sets of additional digital data words associated with each identified target. Each set consists of four digital data words associated with one target. These four words indicate the Doppler frequency of the target, the magnitude of the signal reflected from the target at the channel 1 frequency, the magnitude of the signal reflected from the target at the channel 2 frequency, and the difference between the phase of the channel 1 and channel 2 signals.

In the preferred embodiment of the present invention, the magnitude of the channel 1 and channel 2 reflected signals are transmitted from the DSP 508 to the microcontroller 510 only to aid in determining when the system has failed to properly identify a target. For example, under normal conditions, the magnitude of the channel 1 frequency should be approximately equal to the magnitude of the channel 2 frequency. If the two magnitudes are not approximately equal, it is likely that the target in question was erroneously detected and the data is disregarded.

Likewise, the magnitude of the low frequency noise floor and the magnitude of the high frequency noise floor are used to check the validity of the FFT operation, the presence of RF interference, and the functionality of the microwave portion of the antenna/microwave section 200. Since it is a characteristic of the noise floor spectrum output by an FFT that the low frequency noise floor has a higher apparent power level then the high frequency noise floor, the microcontroller 510 checks to ensure that such is the case. If the low frequency noise floor is not greater than the high frequency noise floor, then an error/interference condition is assumed.

If the microcontroller 510 determines that the noise floor is above a selected threshold value, an assumption is made that there is RF interference with the transmit signal at one or both of the transmit frequencies. In such a case, the microcontroller 510 sends a command to the DSP 508 to flush the data that has thus far been stored and restart the sequence described in the flow chart shown in FIG. 11, with the exception that the FPGA 504 need not be initialized with the first address in the RAM 506 (STEP 900). In addition, the microcontroller 510 commands the frequency voltage generator 316 to change the level of the voltages applied to the Gunn diode 202, thereby changing the transmit frequency. Further details of this interference detection feature are provided in copending U.S. patent application Ser. No. 07/930,760, entitled Interference Avoidance System for Automotive Radar System.

5. Range and Relative Speed

From the information transmitted to the microcontroller 510 from the DSP 508, the microcontroller 510 calculates the range and relative speed of each target. The determination of the relative speed and distance is directly calculated by multiplying the frequency and phase difference by fixed factors, since the phase is linearly proportional to distance to (or range of) the target according to the formula, $R=C(\Theta_1-\Theta_2)/(4\pi(f_1-f_2))$, and frequency is linearly proportional to the relative speed of the target according to the formula, $f_d=72(Hz\cdot hours/mile)\times V$ (miles/hour). In the range formula, R is the range in feet, C is the speed of light in feet/second, $f_1$ is the frequency of the channel 1 signal, and $f_2$ is the frequency of the channel 2 signal. In the relative speed formula, $f_d$ is the frequency shift due to the Doppler phenomenon, and V is the relative velocity of the target with respect to the transceiver. However, in alternative embodiments, other means to map the frequency to a relative speed and the phase relationship to range may be used. For example, a table may be used to cross-reference frequency and phase to relative speed and distance, respectively.

If the data is not within selected preset limits it is deemed to be invalid and is disregarded. If the data is within the preset limits, the microcontroller 510 compares the new target range and relative speed with ranges and relative speeds previously recorded. If the range and relative speed of a target is consistent with the range and relative speed of a previously recorded target (i.e., if the difference between the range and speed of a new target and the range and speed of a previously recorded target is within a predetermined amount), the microcontroller 510 updates the range and relative speed previously recorded with the newly received range and relative speed. If the new target does not correspond to an existing target, the range and relative speed are stored and a new target is thus defined. When the microcontroller 510 fails to receive data that closely matches a previously recorded target, the previously recorded target is assumed to have left the environment and the range and relative speed are dropped from the record. Thus, the system identifies and tracks a multiplicity of targets concurrently.

The microcontroller 510 employs a target priority system to determine which one of the multiplicity of targets presents the greatest hazard, assigns a hazard priority, and alerts the driver with the appropriate level of urgency. The system continues to track and reevaluate the hazard priority assigned to each target. If the range and relative speed of an older target fails to be similar to the range and relative speed of newer targets, the system discontinues tracking the old target while continuing to track each of the remaining targets.

A hazard algorithm may be used which is as simple as alerting the vehicle operator that a target is present within a range of 500 ft., as in the illustrated embodiment of present invention. More sophisticated algorithms such as the algorithm taught in U.S. Pat. No. 4,916,450 entitled Radar System for Headway Control of a Vehicle, which is hereby incorporated by reference are used in alternative embodiments of the present invention.

6. Hazard Indicators and Displays

In the context of the obstacle detection and collision avoidance system, the digital electronics system 500 is coupled to a display and sensor section 600. The display and sensor section 600 has a display, indicators and/or actuators 4b, for displaying indications to a user and/or controlling various aspects of vehicle operation (for example, flashing a dashboard warning light to a user if a vehicle is approaching too rapidly, and/or, in extreme conditions, automatically activating the vehicle brakes and/or air bag).

Figure 12:
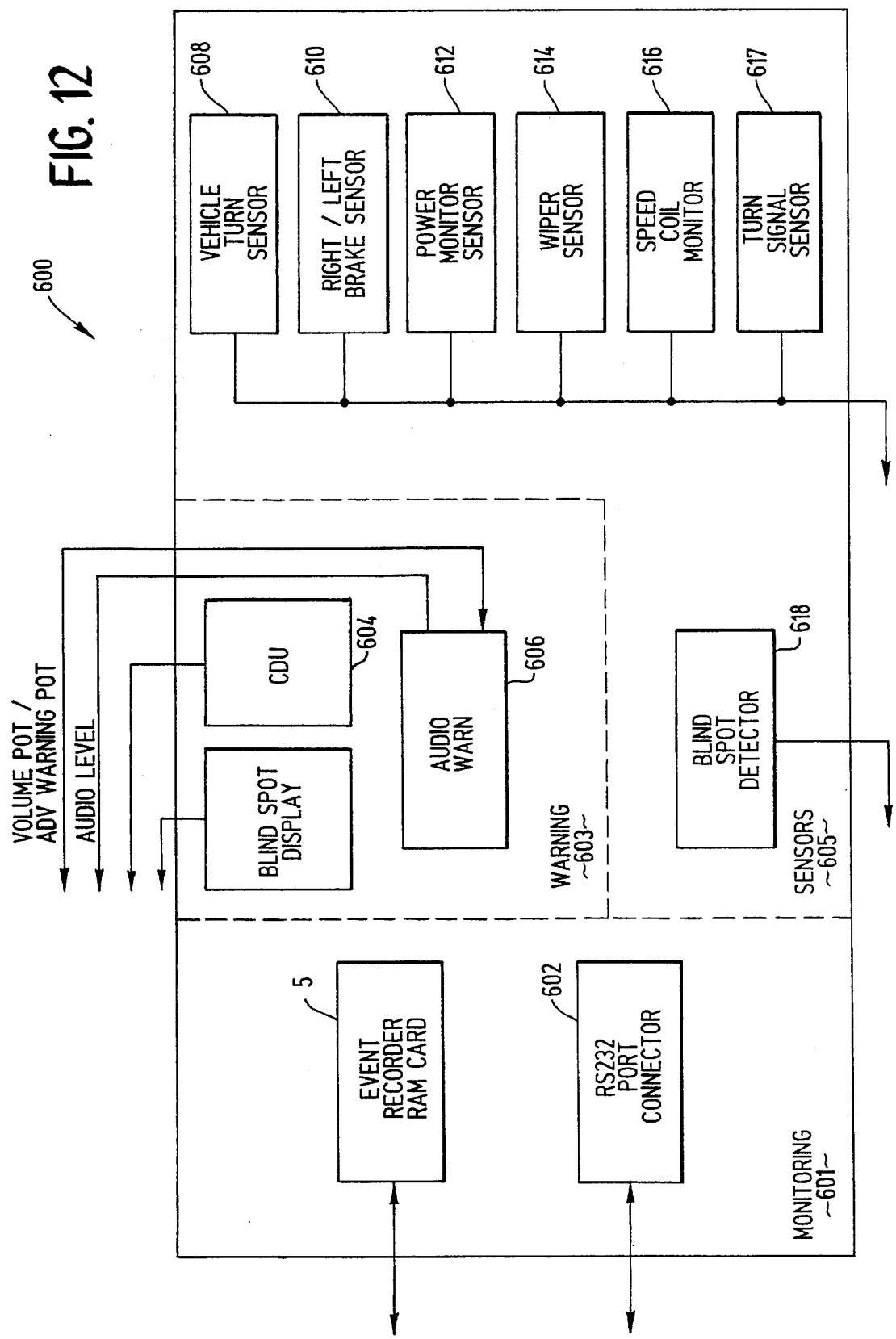
FIG. 12 is a block diagram of the display and sensor section of the vehicular radar system of the present invention.

The display and sensor section 600 of FIG. 2 is shown in more detail in FIG. 12. The display and sensor section 600 includes a monitoring section 601, a warning section 603, and a sensor section 605.

The sensor section 605 includes a multiplicity of sensors, such as a vehicle steering sensor 608, a brake sensor 610, a power monitor sensor 612, a windshield wiper sensor 614, and a speed coil sensor 616 a turn signal sensor 617, and/or a blind spot detector 618. The microcontroller 510 is coupled to each sensor 608, 610, 612, 614, 616, 617, and 618. The sensors provide information which is used to determine whether there is a danger present or to alter the factors used to compute a hazard level. For example, if the microcontroller 510 detects that the windshield wipers of the vehicle have been turned on, thus indicating a rain condition, the preferred following distance from targets may be lengthened to account for longer stopping distances on a wet road. Additionally, the power output by the transmitter may be increased to compensate for the attenuation caused by rain or snow conditions.

If a danger is present, the microcontroller 510 activates an appropriate visual and/or audio warning. The level of the danger is preferably determined based upon brake lag, brake rate, vehicle speed, closing rate, target distance, and the reaction time of the operator. In the preferred embodiment, an average reaction time is used. However, the microcontroller 510 could request the operator to perform various exercises to establish the particular reaction time of the operator at the time that a trip begins. Alternatively, the vehicle operator's reaction to events that occur throughout a trip may be used to determine the reaction time of the operator.

The warning section 603 includes a control display unit 604, blind spot display unit, and an audio warning unit 606. The control display unit 604 includes warning lights that are illuminated when a danger is present. In the preferred embodiment of the present invention, the color of the lights change from green to yellow to red, respectively, as the level of the danger increases. The audio warning unit 606 includes a sound generator that emits an audible beep or warble if the hazard level exceeds a threshold level.

In the preferred embodiment, the microcontroller 510 monitors a volume potentiometer (not shown) and an advanced warning potentiometer (not shown) within the control display unit 604. The volume potentiometer and the advanced warning potentiometer are controlled directly by the vehicle operator. It should be understood that a wide variety of methods for warning the vehicle operator of danger fall within the scope of the present invention, such as inducing vibration in the steering wheel, pedals or other vehicle controls, such that the vibration increases as the level of the warning increases, and/or activating an audible tone that increases in pitch or volume as the level of the warning increases.

The monitoring section 601 preferably includes an EIA RS-232 port connector 602. The RS-232 port connector 602 provides a port from which target information can be communicated to external devices, and from which diagnostics can be performed on the system. The microcontroller 510 is coupled to RS-232 port connector 602, thereby providing information and system access to external devices coupled to the port connector 602.

Event Recorder Apparatus

Figure 8:
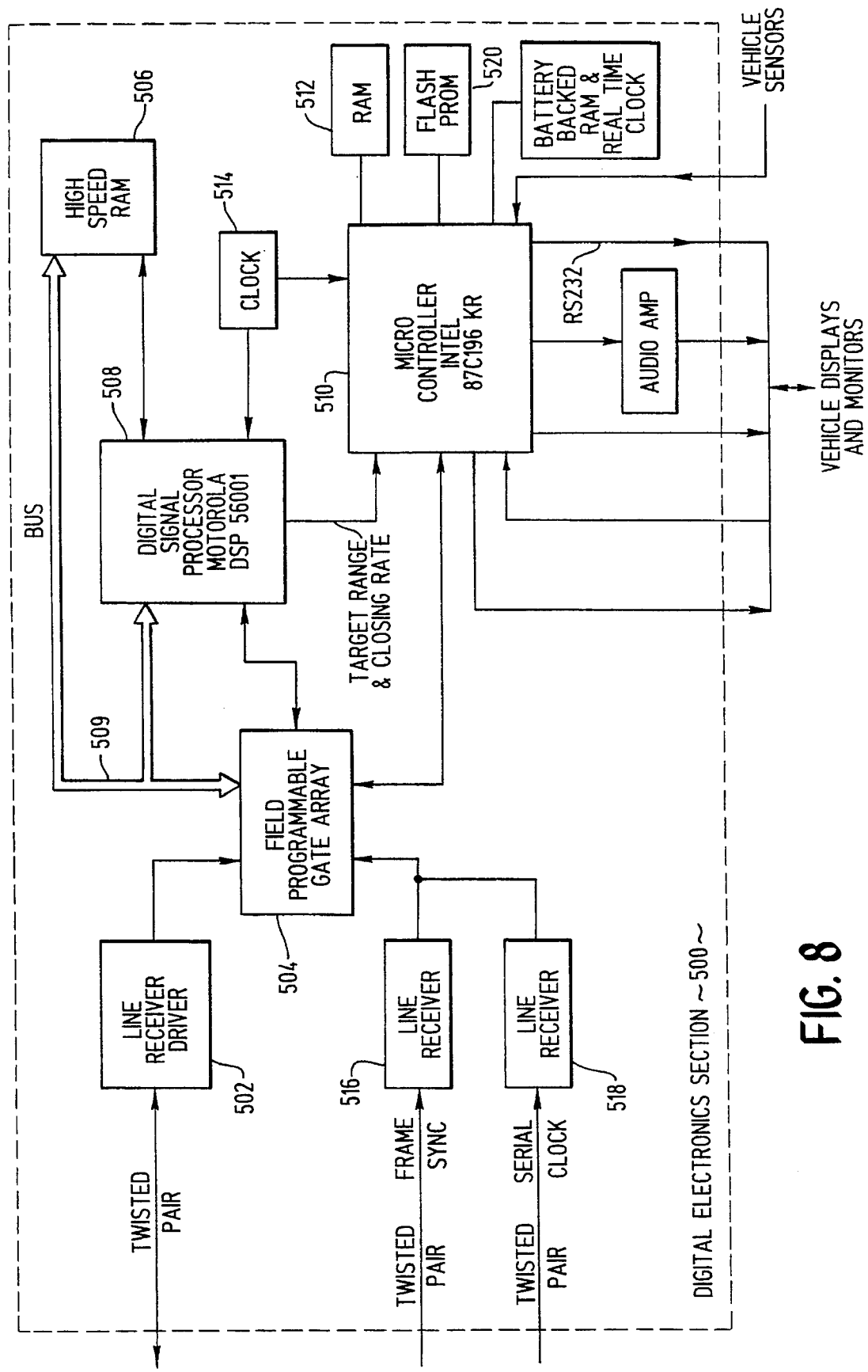
FIG. 8 is a block diagram of the digital electronic section of the vehicular radar system of the preferred embodiment of the present invention.
Figure 13:
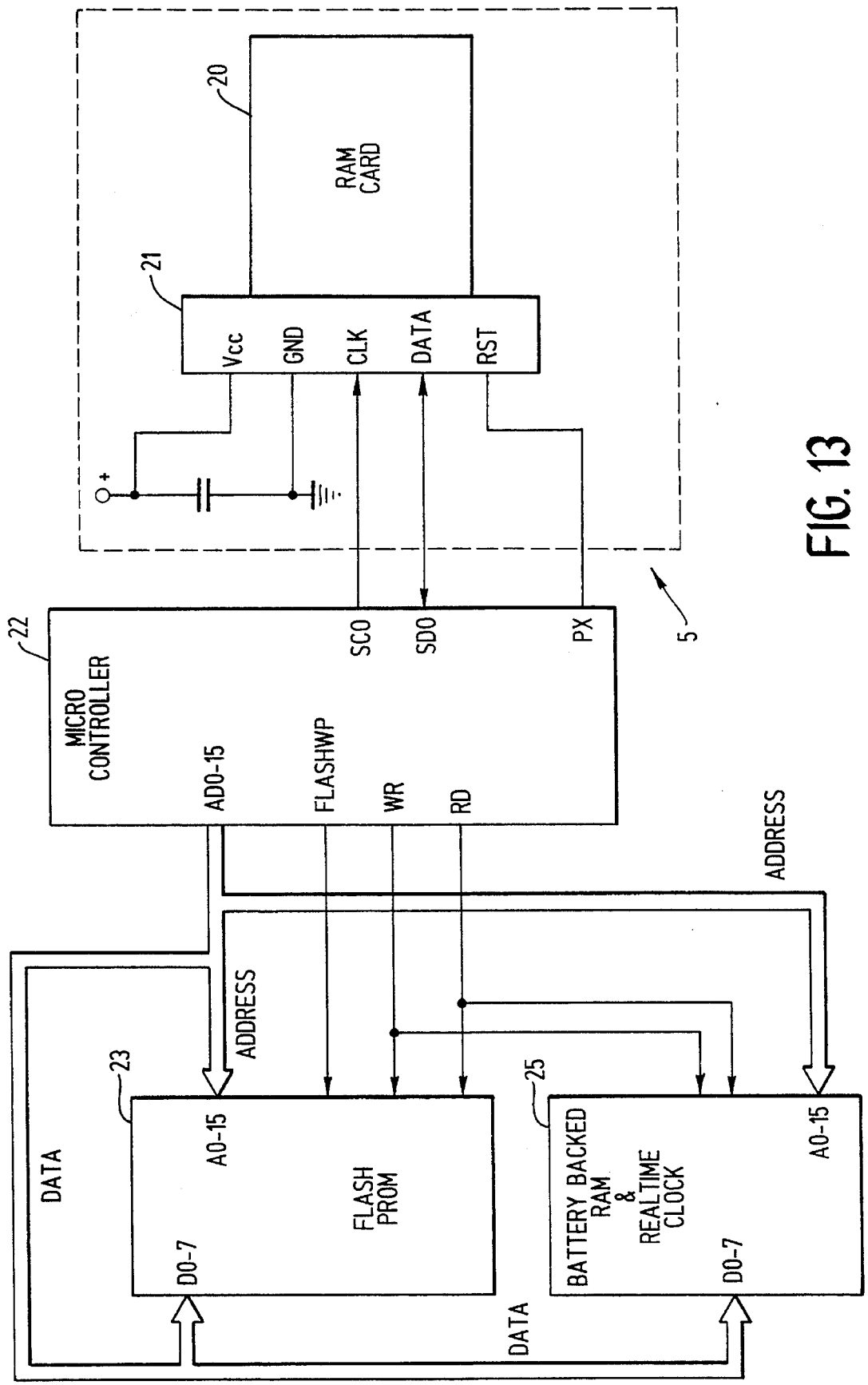
FIG. 13 is a block diagram of a RAM card in accordance with the present invention, shown connected to the radar system microcontroller and a non-volatile memory device.

FIG. 13 shows a more detailed block diagram of the ERA of the preferred embodiment of the present invention, showing a RAM card 20 coupled through an interface receptacle 21 to a microcontroller 22 (which may be the microcontroller 510 shown in FIGS. 3 and 8, but can be an independent microcontroller coupled to the microcontroller 510). In the preferred embodiment, the microcontroller 22 includes a real-time clock. The microcontroller 22 is also coupled to a non-volatile memory device 23. "Non-volatile" means that the data stored in the memory device 23 will be retained even if power is interrupted to the device. In the preferred embodiment, the memory device 23 is a "flash" programmable memory device available from a number of suppliers and a battery backed RAM/Real-time clock 25. Such devices are electrically alterable, but retain their data even after power is removed from the device. Alternatively, the memory device 23 may comprise, for example, dynamic RAM with a battery backup and refresh circuitry, static RAM with a battery backup, electrically alterable read-only memory, or other solid-state, non-volatile memory technologies known in the art.

The microcontroller 22 and non-volatile memory device 23 are coupled in known fashion by Address and Data buses, and read/write control lines FLASHCSB, RD, WR, as shown, such that the microcontroller 22 can read data from, and write data to, the non-volatile memory device 23. The memory device 23 is preferably used to store programs to be executed by the microcontroller 22 for control of all, or various aspects, of the components shown in FIG. 3.

In the preferred embodiment, the interface between the RAM card receptacle 21 and the microcontroller 22 is kept as simple as possible. Preferably, a standard 3-wire (not including power and ground) serial interface bus is used, which has a clock line CLK for the data transfer clock, a DQ line bidirectional data line, and an $\overline{RST}$ line to enable/disable the RAM card 20. The 3-wire bus is coupled to the microcontroller 22 as shown.

An advantage of the simple 3-wire serial interface bus preferred for use with the present invention is that it is well known, simple to implement, and requires a minimum amount of interface connection between the RAM card 20 and the microcontroller 22. However, other interfaces could be used, such as the more complete RS232 serial interface standard. As another alternative, the RAM card receptacle 21 could be an adapter compatible with the Personal Computer Memory Card International Association (PCMCIA) interface. As yet another alternative, a fiber optic connection could be used, which would give the system greater immunity from electromagnetic interference.

The RAM card 20 comprises one or more non-volatile memory devices and appropriate control and interface circuitry. The RAM card 20 may comprise, for example, dynamic RAM with a battery backup and refresh circuitry, static RAM with a battery backup, flash memory devices, electrically alterable read-only memory, or other solid-state, non-volatile memory technologies known in the art. The data storage capacity of the RAM card 20 is a matter of design choice and available integrated circuit chip capacity and size. In the illustrated embodiment, the capacity of the RAM card 20 is at least 32 kBytes.

The RAM card 20 may be custom designed, or may be a commercial product. In the preferred embodiment of the present invention, the RAM card 20 comprises a model DS6417 "CyberCard" from Dallas Semiconductor, Inc.

Figure 14:
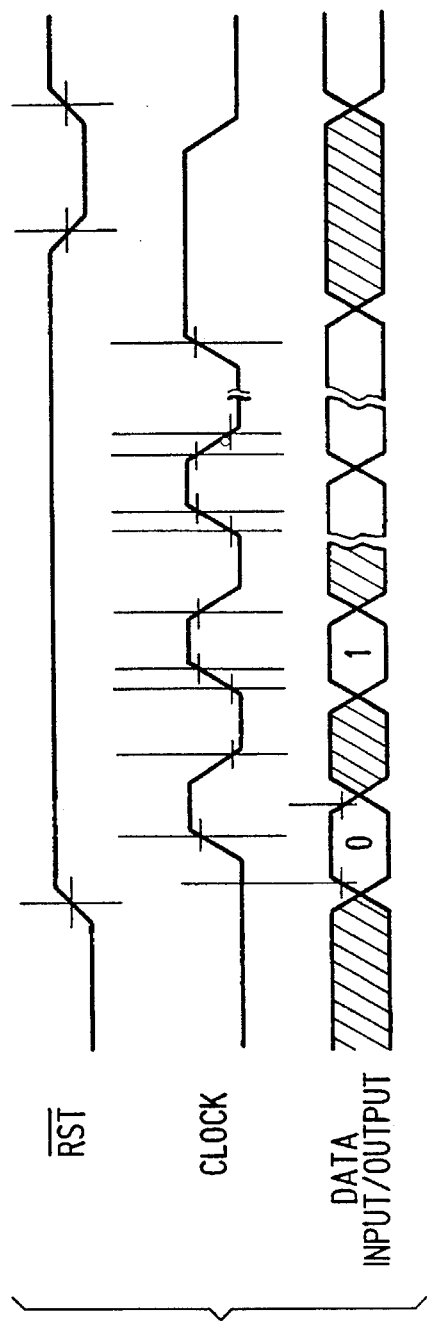
FIG. 14 is a timing diagram of a Write cycle to a RAM card in accordance with the present invention.
Figure 15:
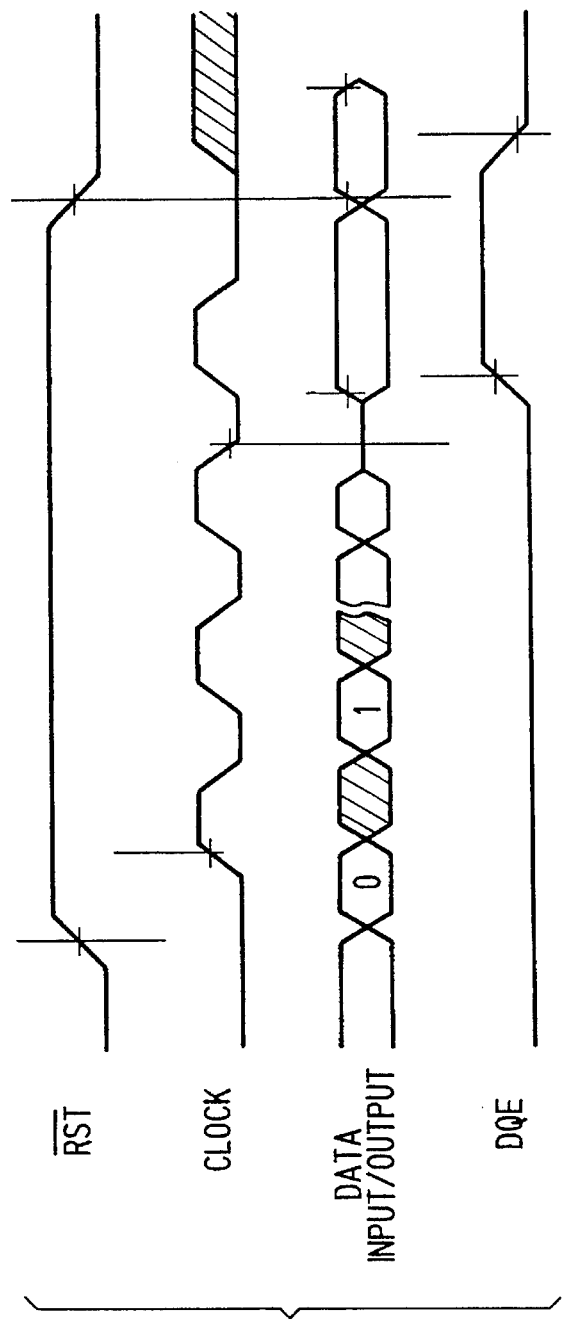
FIG. 15 is a timing diagram of a Read cycle from a RAM card in accordance with the present invention.

In the preferred embodiment, the microcontroller 22 begins a data transfer to the RAM card 20 by sending a 56-bit protocol word to the RAM card 20. Referring to FIGS. 14 and 15, all data transfers to and from the RAM card 20 are initiated by setting the $\overline{RST}$ input to a logical "1". Each data transfer is terminated by resetting the $\overline{RST}$ signal to a logical "0". In the preferred embodiment, the protocol word includes a command byte, 2 bytes for the starting address where data storage or retrieval will begin, and a cyclic redundancy check (CRC) byte or word that ensures all bits have been transmitted correctly.

After the desired operation (e.g., Read or Write) is specified by the 56-protocol word, a first byte is read from or written to the designated address a bit at a time. The address is then automatically incremented to the next location, and a next byte is read or written. As desired, the microcontroller 22 can write any data from the non-volatile memory device 23 to the RAM card 20, or vice versa.

Referring to FIG. 14, for a Write cycle to the RAM card 20, the data input bits and the command word bits on the DQ line must be valid during the rising edge of the clock signal CLK. Referring to FIG. 15, for a Read cycle from the RAM card 20, data bits read out of the RAM card 20 must be valid during the falling edge of the clock signal CLK. When data transfers are terminated by the reset of the $\overline{RST}$ signal, the transition of the $\overline{RST}$ signal from a logical "1" to a logical "0" must occur during a logical "1" state of the clock signal CLK. This simple protocol ensures a generally error-free transfer of data to and from the RAM card 20.

Figure 16:
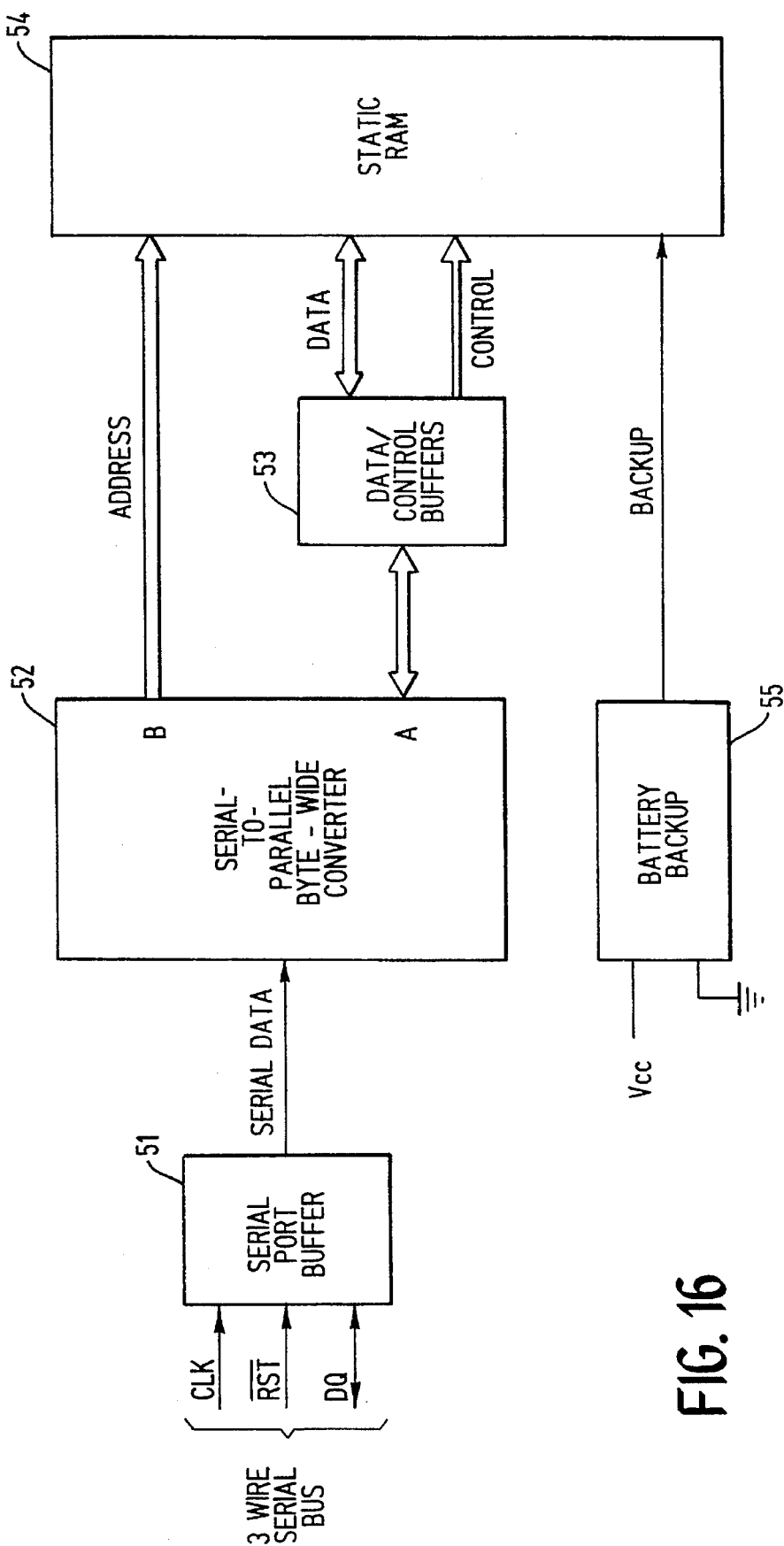
FIG. 16 is a detailed block diagram of a RAM card in accordance with the present invention.

FIG. 16 is a more detailed block diagram of the RAM card 20 in accordance with the present invention. A serial port buffer 51 serves as the electrical interface to the preferred 3-wire serial bus shown in FIG. 13. The serial port buffer 51 is coupled to a serial-to-parallel byte-wide converter 52, which converts serial data to and from byte-wide parallel data. The converter 52 responds to the clock signal CLK and $\overline{RST}$ input to accept data from or transmit data to the data line DQ. The converter 52 also controls a non-volatile memory 54 through the use of a data/control buffer 53, as provided by the manufacturer.

In the illustrated embodiment, the memory 54 is a static RAM with sustaining power supplied by a battery 55, permitting the RAM card 20 to be removed from the RAM card receptacle 21. The battery backup also protects against data loss if the power from the RAM card receptacle 21 is interrupted due to system failure or an accident.

If fixed-size data blocks are used, data stored in the memory 54 is delimited by an implicit block size. If variable-size data blocks are used, the data preferably contain internal record and field length counts and/or unique delimiters, so that the blocks can be read back in a meaningful manner. Such variable-size record structures are well-known in the art. However, for simplicity of implementation, the preferred embodiment of the invention uses fixed-size data blocks.

In operation, a RAM card 20 would be inserted into the RAM card receptacle 21. In the preferred embodiment, selected data would be gathered from the vehicle sensors 4a and/or the digital electronics section 500 by the microcontroller 22, typically after the vehicle is started. The data is stored into the RAM card 20 by the microcontroller 22 at periodic intervals, which may be determined by time and/or by distance traveled. The microcontroller 22 may also do some computation on the data, such as determining a miles-per-gallon value or average speed, to derive processed data for storage in the RAM card 20.

In general, data blocks would be stored in the RAM card 20 beginning at the first location in the memory 54. The address is incremented to point to successive storage locations for storing subsequent data blocks.

Different modes of operation can be used. In a first mode, selected data is stored approximately every 0.5 seconds, until the memory 54 on the RAM card 20 is full (which, in the illustrated embodiment, takes about 15 minutes). There-after, the address sent to the RAM card 20 by the microcontroller 22 is reset to the first address used, causing the oldest data in the memory 54 to be overwritten with new data (i.e., the memory 54 is operated as a circular queue). This provides a "moving window" of the last 15 minutes of operation (or longer, if longer intervals or a larger capacity memory 54 are used). Recording can be stopped when external power to the RAM card 20 is turned off (for example, when the vehicle is turned off voluntarily or because of an accident), or when the vehicle is not moving. If desired, a delayed turn-off time can be used to continue recording for some period of time after external power is removed, to record, for example, such things as the engine coolant temperature as a measure of residual heat in the engine.

In a second mode of operation, the memory 54 is divided, in a static or dynamic fashion, into multiple logical "pages" for storing independent sets of data. A "current" page may be used to record a moving window of, for example, selected data from the last 5 or 10 minutes of operation, as described above for the first mode of operation. One or more additional pages can be used to record, for example, selected data (which need not be the same items of data stored in the current page) for fixed or variable time periods for later analysis. Such data may include, for example, information related to vehicle maintenance. In such a case, when a page fills up, writing stops, in order to preserve an archival record of the selected data. A page would be "reset" after a read-out of the data or upon execution of a specific command, permitting new data to be written to the page.

In one variation of the second mode of operation, a first page may be used to record a moving window of selected data. If an accident occurs, the first page of data is "frozen", and a next page is used for subsequent recording. An accident condition may be detected automatically, or indicated by activation of a manual switch. In this manner, data can be captured for later analysis of the accident.

In another variation of the second mode of operation, recording to a page other than the current page may be triggered by an unusual event, such as a vehicle operational or performance value exceeding a preset threshold value, or an accident. For instance, it may be desirable to record drive train sensor values only if one or more values, such as engine temperature, exceed a threshold value. As another example, such recording may be triggered by an unusual condition that may indicate an accident, such as a sudden acceleration or deceleration, sudden application of the brakes, activation of an air bag, etc. Recording can also be triggered manually. Recording such information on a separate page in memory, and only upon being triggered by a particular event, permits capturing data for later analysis of vehicle and/or driver performance.

In a third mode of operation, the recording rate may be increased upon the occurrence of an unusual condition, such as a sudden acceleration or deceleration, sudden application of the brakes, activation of an air bag, etc., in order to store more data values surrounding the event, for later analysis.

One skilled in the art would recognize that variations and combinations of these modes of operation could be implemented with the present invention as a matter of design choice.

The selected data may be any of the values mentioned above, or similar values. Further, not all of the values selected need be recorded at the same rate. For example, information that can change rapidly, such as the status of the brake system, vehicle speed, turning conditions, and other information useful for accident reconstruction purposes, may be recorded very frequently (e.g., every 0.2 seconds). Information that changes more slowly, or is less pertinent to accident reconstruction, such as engine temperature, coolant temperature, etc., may be recorded less frequently (e.g., every 5 seconds, or every mile).

In accordance with one means to read out the data collected in the RAM card 20, the RAM card 20 is removed from the interface receptacle on the automotive system and inserted in a similar interface coupled to a personal computer. The data can then be displayed on the computer or stored on a different memory device, such as a floppy disk or a hard drive in the computer.

Figure 17:
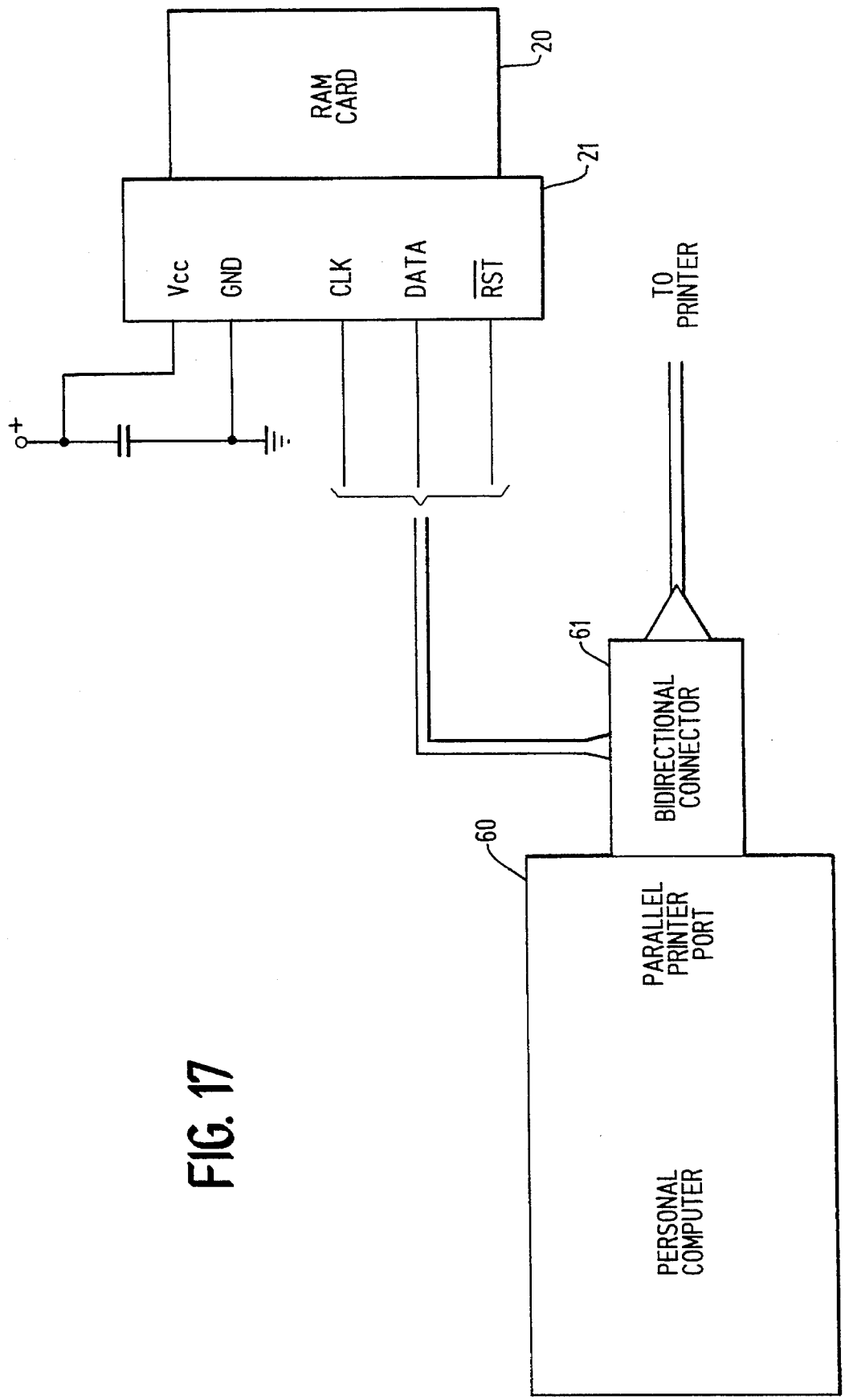
FIG. 17 is a block diagram of an interface between a RAM card in accordance with the present invention and a personal computer.

FIG. 17 is a block diagram of an interface between the RAM card 20 and a personal computer (PC) 60. An interface receptacle 21, identical to the interface receptacle 21 in the vehicle system, is coupled to a bidirectional connector 61 that is connected to a parallel port of the PC 60. The signal lines between the PC 60 and the RAM card 20 are preferably the standard 3-wire serial bus described above. The bidirectional connector 61 may also provide a parallel interface signal pass-through so that a standard parallel interface device, such as a printer (not shown), may still be coupled to the PC 60 through the parallel port. Such pass-through type connectors are well-known in the art.

When a RAM card 20 is removed from a vehicle system, the card is inserted into the interface receptacle 21 for data retrieval by the PC 60. Data is then read out of the RAM card 20 under control of the microcomputer of the PC, using the same process described above with respect to the microcontroller 22. That is, data is transmitted serially through the bidirectional connector 61, through the parallel port and to the microcontroller. The microcontroller converts the serial data to parallel form under software control, in known fashion.

Once data has been retrieved from the RAM card 20, it can be displayed on the PC in a variety of ways, such as in various tabular forms, depending on whether the information represents accident reconstruction information, trip monitoring information, maintenance information, or other information. The manner of presentation of the data is a matter of design choice.

Since the RAM card 20 is removable and relatively inexpensive, each driver of a particular vehicle, such as a fleet car or bus, could be given a personalized RAM card 20. Thus, the ERA invention can be used to monitor the performance of particular drivers, including characteristics such as average driving speed, braking and acceleration habits, typical "headway" distance (i.e., the distance from the vehicle immediately in front in the same lane, as determined by the radar system), etc.

As another aspect of the invention, the ERA can be used to provide an authorization function that prohibits unauthorized personnel from driving a vehicle. Since each driver can be given a personalized RAM card 20, each RAM card 20 can be "keyed" with an electronic "signature" to work only with a particular vehicle. Anyone without a RAM card 20 "keyed" to a vehicle could not drive the vehicle. The "keying" signature may be as simple or as sophisticated as desired, and may be, for instance, a numeric code stored in the first address of the memory 54 of the RAM card 20. A matching code would be stored in the non-volatile memory device 23. The microcontroller 22 would read the pre-stored code in the RAM card 20 and compare the code with the corresponding code read from the non-volatile memory device 23. If no match occurred, the vehicle would not be enabled to operate. In addition, each RAM card 20 may have an "expiration" date coded therein, such that the vehicle would not be enabled to operate if the card had expired.

As still another aspect of the invention, the ERA can be used to load upgraded or updated computer programs (software) into the vehicle system. In this mode of operation, new software is loaded into a RAM card 20 through, for example, a PC 60, before insertion of the RAM card 20 into a vehicle system. The microcontroller 22 in the vehicle system reads the new program data out of the RAM card 20, converts it from serial to parallel form, and stores it in the non-volatile memory device 23 coupled to the microcontroller 22. The uploaded software may be for an automotive electronic control system or an automotive radar system, or both. This feature circumvents the time consuming and cumbersome task of removing the control system from the vehicle to load a software upgrade.

This aspect of the invention can also be used to "customize" or "personalize" the operational characteristics of a vehicle to a driver's preferences. For example, each driver of a fleet vehicle or bus can use the RAM card 20 to upload into the vehicle the driver's preferences relating to desired headway distance, warning thresholds, or any other parameter that can be set through a vehicle's electronic control system.

Further, as automotive technology progresses, the subsystems in a vehicle likely will communicate via a vehicle-wide system serial data bus. The ERA is able to accommodate this technological advance since the invention can be coupled to a serial system bus without major modification. This would allow the invention to record information from other subsystems on the serial bus for accident reconstruction, trip monitoring, or other tasks. The microcontroller 22 would be coupled to the system serial bus, and could either monitor activity on the bus and store relevant information it encounters, or take an active role on the bus by requesting relevant information from other subsystems and then storing such information.

As yet another aspect of the invention, a second ERA 5 could be mounted in a vehicle. A first ERA 5 system can be used to record information pertinent to the vehicle regardless of the identity of the driver (e.g., vehicle maintenance information), while a second ERA 5 system can be used to record information pertinent to each driver on the driver's personal RAM card 20. If desired, the first ERA 5 system may be non-removable, in which case the RAM card 20 and interface receptacle 21 can be replaced with a non-volatile RAM circuit directly coupled to the microcontroller 22.

Thus, the present invention records data until an event, such as an accident, stops the recording. In the preferred embodiment, the RAM card 20 can then be removed and the events leading up to the event read back using a standard personal computer with a matching interface. The invention is thus extremely useful for accident reconstruction as well as more standard vehicle performance, operational status, and/or environment data. In addition, the invention is configurable for a driver's particular preferences, and optionally provides an authorization function that prohibits unauthorized personnel from driving a vehicle, and provides a convenient means for upgrading system-wide software for an automotive electronic control system or an automotive radar system. The RAM card 20 also uses rugged and durable technology that is suitable for integration into an automotive system.

7. Driver Fitness Determination

Figure 18:
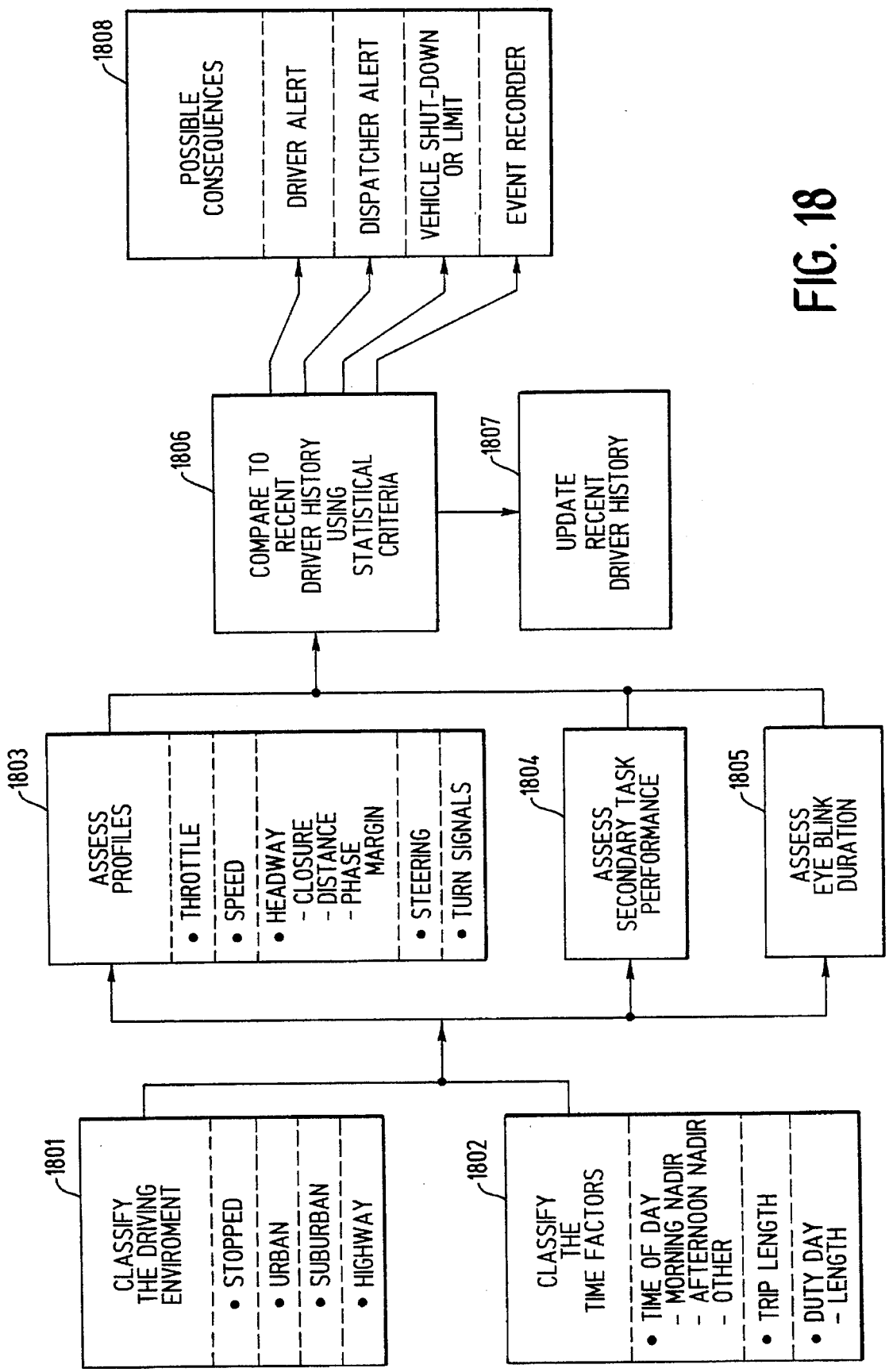
FIG. 18 is a flowchart of the fitness algorithm used to determine the fitness of a motor vehicle driver in accordance with the preferred embodiment of the present invention.

In the preferred embodiment of the present invention, the information recorded in the ERA is accessed by the microcontroller 510 and applied to a fitness algorithm which (1) generates a personalized performance standard for a driver associated with the ERA, and (2) compares the driver's performance over a recent and relatively short period of time to the personalized performance standard. A flow chart of the fitness algorithm is shown in FIG. 18.

In accordance with the preferred embodiment of the present invention, the driving environment is classified by determining whether the vehicle is (1) stopped, (2) in an urban environment, (3) in a suburban environment, or (4) on an open highway (STEP 1801). In the present example, environment classification is determined using speed. Thus, if the speed is 0 mph, then the vehicle is determined to be stopped. An urban environment is determined if the speed is within the range of 0–35 mph. A suburban environment is determined if the vehicle speed is in the range of 35–45 mph. Finally, a highway environment is determined if the speed exceeds 45 mph.

In addition to classifying the environment, certain time factors are classified (STEP 1802). The time factors include time of day (morning nadir, afternoon nadir, or other), trip length, and duty day as determined by length. The fitness algorithm classifies time factors, inasmuch as accidents are more likely to occur during the early morning, pre-dawn hours, and during the mid-afternoon hours. In particular, when the end of a long trip or a long duty period occurs in conjunction with such time periods, the risk of an accident rises.

Certain profiles are then generated (STEP 1803). These profiles include characterizations of the history of the throttle, speed, headway (closure, distance, and phase as determined by margin), steering, headlights, windshield wipers, and/or turn signal use. The throttle profile is determined in accordance with mean value and variability thereof, as is the speed profile. The headway profile includes: (1) the rate at which the vehicle approaches obstacles, including other vehicles (i.e., closure); (2) the vehicle speed; (3) how smoothly the vehicle accelerates, decelerates, and closes on obstacles (i.e., jerk); (4) the distance between the vehicle equipped with the present invention and other vehicles, determined in terms of mean value and variability; (5) "phase margin" (i.e., a measure of the vehicle operator's reserve capacity to respond safely to particular conditions that might arise); and (6) headlights and windshield wipers are monitored since they are indications of poor visibility and road conditions. The steering profile is generated by monitoring the median frequency shifts, in other words, the variations in lane position. The frequency and amplitude of steering changes, correlated to the vehicle speed, provide a simplistic means for determining lane position. Lane position is an important profile in determining driver fitness. The steering profile is generated by monitoring median frequency shifts. Other more sophisticated methods are used in alternative embodiments of the present invention. For example, the relative position and motion of other vehicles detected by the radar system may be used. The turn signal profile is generated by monitoring turn signal use.

The various profiles set forth in the STEP 1803 are used in conjunction with the various driving environments of the STEP 1801, as shown in the table of FIG. 19. Thus, preferably, when a vehicle equipped with the present invention is stopped, the present invention assesses the throttle position, the number of times the driver blinks his eyes, and duration of each such blink. In one embodiment of the present invention, the turn signals and the secondary tasks are not included in the assessment when the vehicle is not moving. However, in an alternative embodiment of the present invention the turn signals are included when the vehicle is stopped. The speed, rate of closure, distance, phase margin and steering are not applicable when the vehicle is stopped. At the other extreme, when the vehicle is determined to be in a highway environment, all of the profiles listed in the table of FIG. 19 are applicable and are utilized. The urban and suburban environments utilize selected ones of the profiles to the exclusion of others, as shown in the table.

If the vehicle is determined to be in a highway environment, secondary task performance is assessed (STEP 1804). Lapses in response, such as a substantial increases in reaction time, are considered by the present invention to indicate drowsiness on the part of the driver.

In accordance with the preferred embodiment of the present invention, the eye blink duration of the vehicle driver is assessed (STEP 1805). This is accomplished by covert digitized video scanning for eye blinks longer than 200 msec. in duration. This assessment is used in all of the driving environments. Long duration eye blinks are interpreted as indicating a state of drowsiness on the part of the driver.

The results of the steps 1803, 1804 and 1805 are compared to a recent history for the driver using statistical criteria (STEP 1806). For example, in one embodiment of the present invention, a performance distribution curve is generated which indicates the level of a driver's performance at any one time with relation to his performance at each other time recorded. The driver's recent driving history is used to generate short term profiles and to evaluate current secondary task performance. Driver patterns that show a driver's recent performance to be at the less desirable ends of that particular driver's performance distribution curve indicate a need for caution.

In STEP 1807, the recent history of the driver is updated. This updating is accomplished using new data derived from the earlier steps of FIG. 18.

One or more of the possible consequences of the data evaluation, particularly in the comparison of step 1806, are then selected (STEP 1808). In the step 1806, as previously noted, the data from the steps 1803, 1804, and 1805 is compared to the recent driver history using statistical criteria. The possible consequences, as determined in the step 1808, include alerting the driver, a dispatcher, shutting down or limiting the operation of the vehicle, and event recording. Upon determining that the driver is operating below the personalized standard associated with that driver, the microcontroller of the illustrated embodiment of the present invention indicates that determination to the driver. Having been alerted to the fact that the driver's performance is below the calculated standard, the driver has a predetermined amount of time to raise the level of performance to the level of the calculated standard. In the illustrated embodiment of the present invention, if the driver is not performing at the required level at the end of the predetermined period, the microcontroller broadcasts a message to a dispatcher or controller at a remote site who is responsible for ensuring the safety of the driver and vehicle. If the driver's performance does not improve a required amount within a predetermined amount of time after the message is broadcast, a warning is presented to the driver indicating that a shut-down of the vehicle is imminent after a predetermined time. In one embodiment of the present invention, the amount of time until the shut-down will occur is displayed to the driver. Additionally, both strong visual and audio warnings are given to the driver to ensure that the driver is aware of the impending shut-down. The shut-down can be implemented as a gradually increasing inability to maintain speed, thus allowing the driver to find a safe location to park the vehicle. In one embodiment of the present invention, a remote shut-down disable is provided which permits the dispatcher, or controller, responsible for the safety of the driver and vehicle to override the shutdown for limited periods to afford the driver additional time to find an appropriate place to park the vehicle. Each action taken in accordance with the fitness algorithm is recorded on the ERA 5, along with the continuing stream of information from the sensors 4a and the radar system.

As another example, in order to enforce mandatory rest stops, a RAM card 20 and microcontroller 22 combination could be programmed to disable the vehicle for a fixed period of time after a stop, or until an authorization code was provided by a dispatcher (such a code could be provided to the microcontroller 22 by means of a 10-key keypad, for example).

Although the preferred embodiment of the invention is illustrated as being used in conjunction with an automotive radar system, it should be understood that the invention can be used in conjunction with any microcontroller-based or microcomputer-based automotive electronic system that gathers data about various vehicle performance and environment factors and can control the loading of such information into a memory device.

A number of embodiments of the present invention have been described. Nevertheless, it will be understood that various modifications may be made without departing from the spirit and scope of the invention. For example, the number of sensors that are used to collect information regarding the vehicle, driver, and environmental conditions may be far less than those that have been cited herein. Also, the invention is not limited to only those sensors that have been listed herein. Furthermore, the number and type of responses to a driver's failure to meet the personal standard established for that driver are not limited to those cited herein. Nor are the particular responses cited herein required as a part of the present invention. Therefore, a system in which the ERA merely recorded the fact that the driver's performance was below the standard set for that driver would be within the scope of the present invention. Furthermore, the standard may be determined by a method other than the method recited herein. For example, a system in which a standard that applies equally to all drivers would be within the scope of the present invention. Still further, any method for recording the events and conditions could be used in the present invention. Thus, the ERA described herein is provided as an example and need not be present in the form described. Also, no radar system is required in the present invention, but is disclosed as an example of a means for collecting information regarding the environment in which the vehicle and driver are operating. Accordingly, it is to be understood that the invention is not to be limited by the specific illustrated embodiment, but only by the scope of the appended claims.

We claim:

1. A system for evaluating fitness of a vehicle driver to operate a vehicle, including:

(a) a collision warning apparatus for collecting data relevant to determining the operational state of the vehicle and the driver;

(b) an operational event recorder apparatus coupled to the collision warning apparatus for recording the collected relevant data and recording a driver profile;

(c) a driver fitness evaluation apparatus coupled to the operational event recorder and the collision warning apparatus for generating the driver profile, and providing a real-time evaluation of the driver's fitness to operate the vehicle by comparing the recorded driver profile with the driver's current performance as indicated by the recorded relevant data.

2. The system of claim 1, wherein the operational state of the vehicle is determined by monitoring:

(a) speed;
(b) headlight use and status;
(c) windshield wipers use and status;
(d) time of day;
(e) use and status of vehicle controls;
(f) headway; and
(g) turn signals use and status.

3. The system of claim 2, wherein the vehicle controls include:

(a) steering wheel;
(b) brake; and
(c) accelerator.

4. The system of claim 1, wherein the driver fitness evaluation apparatus alerts the driver when the driver is determined to be unfit to operate the vehicle.

5. The system of claim 1, wherein the driver fitness evaluation apparatus alerts a person at a location remote to the vehicle and driver when the driver is determined to be unfit to operate the vehicle.

6. The system of claim 1, wherein the driver fitness evaluation apparatus prevents the vehicle from operating when the driver is determined to be unfit to operate the vehicle.

7. The system of claim 1, wherein;

(a) the driver fitness evaluation apparatus classifies the fitness of the driver in one of four classes;
(b) if the driver is classified in the first class, no consequence results;
(c) if the driver is classified in the second class, the driver is alerted;
(d) if the driver is classified in the third class, a person at a location remote to the vehicle and driver is alerted; and
(e) if the driver is classified in the fourth class, the driver fitness apparatus causes the vehicle to cease operating.

* * * * *